United States Patent
Hirotani et al.

(10) Patent No.: US 10,418,866 B2
(45) Date of Patent: Sep. 17, 2019

(54) MULTIPLE-POLYPHASE AC DYNAMO-ELECTRIC MACHINE AND ELECTRIC POWER STEERING DEVICE

(71) Applicant: Mitsubishi Electric Corporation, Chiyoda-ku, Tokyo (JP)

(72) Inventors: Yu Hirotani, Tokyo (JP); Yuji Takizawa, Tokyo (JP); Sachiko Kawasaki, Tokyo (JP); Masatsugu Nakano, Tokyo (JP); Toyoaki Udo, Tokyo (JP); Satoru Akutsu, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 972 days.

(21) Appl. No.: 14/768,316

(22) PCT Filed: May 31, 2013

(86) PCT No.: PCT/JP2013/065155
§ 371 (c)(1),
(2) Date: Aug. 17, 2015

(87) PCT Pub. No.: WO2014/192130
PCT Pub. Date: Dec. 4, 2014

(65) Prior Publication Data
US 2016/0172918 A1 Jun. 16, 2016

(51) Int. Cl.
*H02K 1/16* (2006.01)
*H02K 3/28* (2006.01)
*H02K 29/03* (2006.01)

(52) U.S. Cl.
CPC ............. *H02K 1/165* (2013.01); *H02K 1/16* (2013.01); *H02K 3/28* (2013.01); *H02K 29/03* (2013.01)

(58) Field of Classification Search
CPC ............ H02K 3/28; H02K 1/16; H02K 1/165; H02K 29/03
See application file for complete search history.

(56) References Cited

U.S. PATENT DOCUMENTS 2,354,551 A * 7/1944 Sawyer .................... H02K 1/16
29/596
4,550,267 A * 10/1985 Vaidya ..................... H02K 3/28
310/112

(Continued)

FOREIGN PATENT DOCUMENTS

CN 1937357 A 3/2007
CN 103858327 A 6/2014
(Continued)

OTHER PUBLICATIONS

Communication dated Nov. 9, 2017, from the State Intellectual Property Office of the P.R.C. in counterpart Chinese application No. 201380077036.3.

(Continued)

*Primary Examiner* — Mohamad A Musleh
(74) *Attorney, Agent, or Firm* — Sughrue Mion, PLLC; Richard C. Turner

(57) ABSTRACT

A multiple-polyphase AC dynamo-electric machine, wherein each of the plurality of the teeth provides the flange part to the NS magnetic pole part of the rotor side end part, the stator core has a magnetic connection part which connects the flange parts adjoined each other in the NS magnetic pole of each of the plurality of teeth, the connection part is provided corresponding to each of the slot and an inner peripheral side of the corresponding slot, the radial width of the connection part are smaller than both of the circumferential width of the teeth, thereby the radial widths of the connecting sections are smaller than both the circumferential widths of the teeth and the radial widths of the flanges, (Continued)

voltages generated when the magnetic flux generated by current flowing through one group of windings links with the windings in another group are suppressed effectively.

21 Claims, 18 Drawing Sheets

(56) References Cited

U.S. PATENT DOCUMENTS

| | | | | |
|---|---|---|---|---|
| 5,859,486 | A | * | 1/1999 | Nakahara ................. H02K 1/14 310/216.004 |
| 6,483,221 | B1 | | 11/2002 | Pawellek et al. |
| 2001/0022482 | A1 | * | 9/2001 | Leyvraz .................. H02K 1/16 310/429 |
| 2006/0108890 | A1 | * | 5/2006 | Hauger .................... H02K 1/16 310/214 |
| 2006/0220486 | A1 | * | 10/2006 | Miyashita ................ H02K 3/28 310/179 |
| 2007/0063610 | A1 | | 3/2007 | Miyashita |
| 2007/0194650 | A1 | * | 8/2007 | Ito ........................... H02K 3/28 310/179 |
| 2014/0145547 | A1 | | 5/2014 | Nakano et al. |

FOREIGN PATENT DOCUMENTS

| | | | |
|---|---|---|---|
| JP | 60-128852 | A | 7/1985 |
| JP | 02-007839 | A | 1/1990 |
| JP | 7-264822 | A | 10/1995 |
| JP | 2005027437 | A | 1/2005 |
| JP | 2005-237068 | A | 9/2005 |
| JP | 2006-211820 | A | 8/2006 |
| JP | 2007-49774 | A | 2/2007 |
| JP | 2007-151232 | A | 6/2007 |
| JP | 2007-295763 | A | 11/2007 |
| JP | 4467202 | B2 | 5/2010 |
| WO | 2013/054439 | A1 | 4/2013 |

OTHER PUBLICATIONS

Communication dated Sep. 29, 2015 from the Japanese Patent Office issued in corresponding application No. 2015-519570.
Communication dated Jan. 20, 2017, issued from the European Patent Office in counterpart European Application No. 13885843.6.
Communication dated Mar. 28, 2017, from the State Intellectual Property Office of People's Republic of China in counterpart Application No. 201380077036.3.
Communication dated Jan. 26, 2018 from the State Intellectual Property Office of the P.R.C. in counterpart application No. 201380077036.3.
Communication dated Feb. 15, 2019 from Indian Patent Office in counterpart Indian Application No. 7027/CHENP/2015.
Communication dated Nov. 15, 2018 from the European Patent Office in counterpart Application No. 13 885 843.6.

* cited by examiner (a) Fig of connection Δ

(b) Fig of connection Y (a)

(b)

MULTIPLE-POLYPHASE AC DYNAMO-ELECTRIC MACHINE AND ELECTRIC POWER STEERING DEVICE

CROSS REFERENCE TO RELATED APPLICATIONS

This application is a National Stage of International Application No. PCT/JP2013/065155, filed on May 31, 2013, the contents of all of which are incorporated herein by reference in their entirety.

TECHNICAL FIELD

The invention relates to a multiple-polyphase AC dynamo-electric machine that is used for a motor of a vehicle using power steering, in particular the stator that is the structure of the armature, and an electric power steering device.

BACKGROUND ART

As in Patent Document 1, there is a structure of a multiple-polyphase motor that owns multiple groups in one of the AC motor of the group of polyphase that is composed by the invertor driving the polyphase and the polyphase aforesaid. Further, as in Patent Document 2, there is a permanent magnet motor which reduce the cogging torque.
[Patent Literature 1] JPH7-264822A
[Patent Literature 2] JP4476202B

DISCLOSURE OF INVENTION

Technical Problem

In a multiple-polyphase AC dynamo-electric machine, as in Patent Document 2, if the teeth of the adjacent stator iron core are simply connected, by disposing closely the multiple group of the polyphase group, by chaining one of the polyphase group that produces the magnetic flux to other polyphase group through the connection part aforesaid, a voltage is generated in the other polyphase groups aforesaid.

Since the applied voltage for the passage of the electric current is superposed as a noise in the invertor of the other polyphase group, there is an issue that the motor control to offset the pulsation torque produced by the polyphase groups in the opposite phase becomes more difficult.

The present invention has been made in order to solve such a problem, in a multiple polyphase AC dynamo-electric machine that provides the armature that owns multiple polyphase group winded around the stator iron core that provides plurality of magnetism teeth and the aforesaid teeth, and the rotor that is relatively positioned through the magnetic air gap, it is intended and it is an object to effectively control the voltage generated and interlinked to one of the group that has generated the magnetic flux by the passage of the electric current in one group.

Solution to Problem

The present invention relate to a multiple-polyphase AC dynamo-electric machine that provides an armature having a stator core having a plurality of magnetic teeth, and an armature winding containing the multiple polyphase winding group stored in slots between each of the teeth and winded around the teeth, a rotor that is relatively positioned to the armature through the magnetic air gap and rotates around an axis of a rotation shaft, wherein each of the plurality of the teeth provides the flange part to the NS magnetic pole part of the rotor side end part, the stator core has a magnetic connection part which connects the flange parts adjoined each other in the NS magnetic pole of each of the plurality of teeth, the connection part is provided corresponding to each of the slot and an inner peripheral side of the corresponding slot, the radial width of the connection part are smaller than both of the circumferential width of the teeth, since both are smaller than the circumferential width and radial width of the flange portion of the tooth, the voltage generated and interlinked to one of the group that has generated the magnetic flux by the passage of the electric current in one group if effectively controlled.

Also, relate to a multiple-polyphase AC dynamo-electric machine that provides an armature having a stator core having a plurality of magnetic teeth, and an armature winding containing the multiple polyphase winding group stored in slots between each of the teeth and winded around the teeth, a rotor that is relatively positioned to the armature through the magnetic air gap and rotates around an axis of a rotation shaft, wherein the connection part is provided corresponding to each of the slot to one part of several positions in the axial direction of the stator core and the corresponding inner peripheral side of the corresponding slot, the connection part is also disposed in the slot supplied by any of the group of the armature winding composed of the multiple polyphase, because the aforesaid connection part is also arranged in the armature phase dedicated slots of each of the phase group of the armature phase composed of the polyphase group above-mentioned, for the balance of the magnetism circuit of all the phases and the inductance balance be favorable, the imbalance in current between the phase group decreases, the torque ripple become smaller, and the resulting vibration and noise is also reduced.

Advantageous Effects of Invention

According to the present invention, a multiple-polyphase AC dynamo-electric machine providesan armature having a stator core having a plurality of magnetic teeth, and an armature winding containing the multiple polyphase winding group stored in slots between each of the teeth and winded around the teeth, a rotor that is relatively positioned to the armature through the magnetic air gap and rotates around an axis of a rotation shaft, wherein each of the plurality of the teeth provides the flange part to the NS magnetic pole part of the rotor side end part, the stator core has a magnetic connection part which connects the flange parts adjoined each other in the NS magnetic pole of each of the plurality of teeth, the connection part is provided corresponding to each of the slot and an inner peripheral side of the corresponding slot, the radial width of the connection part are smaller than both of the circumferential width of the teeth, it is possible to control effectively the voltage generated on the winding group to the magnetic flux generated by the passage of the electric current of the space of the winding group, the voltage interferences between the winding group are effectively reduced, the pulsation torque due to the ripple component of the current to improve the response of the current control system is effectively reduced.

Also, according to another invention, a multiple-polyphase AC dynamo-electric machine that provides an armature having a stator core having a plurality of magnetic teeth, and an armature winding containing the multiple polyphase winding group stored in slots between each of the teeth and winded around the teeth, a rotor that is relatively positioned to the armature through the magnetic air gap and rotates around an axis of a rotation shaft, wherein the connection part is provided corresponding to each of the slot to one part of several positions in the axial direction of the stator core and the corresponding inner peripheral side of the corresponding slot, the connection part is also disposed in the slot supplied by any of the group of the armature winding composed of the multiple polyphase, because the aforesaid connection part is also arranged in the armature phase dedicated slots of each of the phase group of the armature phase composed of the polyphase group above-mentioned, since the magnetic circuit balance of all the coil group and the inductance balance is improved, the imbalance in current between the winding groups is decreased, the torque ripple becomes smaller, and the resulted vibration and noise are reduced.

BRIEF DESCRIPTION OF DRAWINGS

FIG. 1 is an explanation view showing a method for connecting the armature of the multiple polyphase AC motor.

FIG. 2 is an explanation view showing an equivalent circuit of the armature winding between the groups.

FIG. 3 is an explanation view explaining the circuit configuration of the q-axis of the multiple polyphase motor.

FIG. 4 is an explanation view of the electric drive unit.

FIG. 5 is a sectional view of the configuration of a multiple polyphase motor.

FIG. 6 is a sectional view showing an example of a configuration of a multiple polyphase motor.

FIG. 7 is a sectional view showing a winding pattern of the multiple polyphase AC motor armature.

FIG. 8 is an explanation view of the motor drive unit.

FIG. 9 is an enlarged sectional view of the iron stator core of the multiple polyphase AC motor.

FIG. 10 is an explanation diagram of the shape of the connecting and the flang parts.

FIG. 11 is a sectional view showing an example of a rotor that owns the field pole generated by the field.

FIG. 12 is an explanation diagram showing an example of a reluctance type rotor without using the FIG. 13 Regarding to the second embodiment of the present invention.

FIG. 14 is an explanation view as an example of the connection part, showing a case where the connection part is finely divided in the axial direction.

FIG. 15 is an explanation view as an example of the connection part, showing a case where the radical direction of the connection width b of the connection part is smaller than the width a of the flange.

FIG. 16 is an explanation view showing the relationship between the iron stator core and the rotor core.

FIG. 17 is an explanation view showing the case where there is a difference in the circumferential direction of the position of the connection part between the adjoined flange part.

FIG. 18 is an enlarged explanation view showing the iron stator core of the multiple polyphase AC motor.

FIG. 19 is an explanation view showing the magnetic flux path of the enlarged part of the FIG. 18 when there is passage of the electric current in one group.

FIG. 20 is an explanation view explaining the case where a thin plate without connection part is continuously stacked.

FIG. 21 is an explanation view showing the electric power steering unit

DESCRIPTION OF EMBODIMENTS

First Embodiment

The first embodiment has the particularity to represents an example of a multiple polyphase AC dynamo-electric machine that provides an stator core furnished by multiple magnetic teeth, an armature that owns the armature winding composed of the multiple polyphase winding supplied by the teeth of the slot wound around the teeth afore-mentioned, and a rotor that rotates in the axis of direction relatively disposed through a magnetic air gap, each of the plurality of teeth is provided with a flange part on the magnetic pole part of the rotor end part of the rotor side, the stator core has a magnetic connection part connected between the flange part above-mentioned adjoined to the NS magnetic pole of each of the plurality of teeth above-mentioned, the aforesaid connection part is provided on an inner peripheral side of the aforesaid slot which corresponds to each of the slots, the radial width of the aforesaid connection part is smaller than any of the circumferential width and radial width of the flange part of the teeth.

Hereinafter, a second embodiment of multiple polyphase AC dynamo-electric motor will be described with reference to FIGS. 1 to 12 in this order:

"Description of the electric drive unit", "description of the double inverter", "Description of problem", "Description of the noise voltage", description of the basic concept of the invention", "description of the magnetic resistance of the magnetic pole 1 (stair shape)", "description of the magnetic resistance of the magnetic pole 2 (curved shape)".

Description of the Electric Drive Unit

Figure 4:
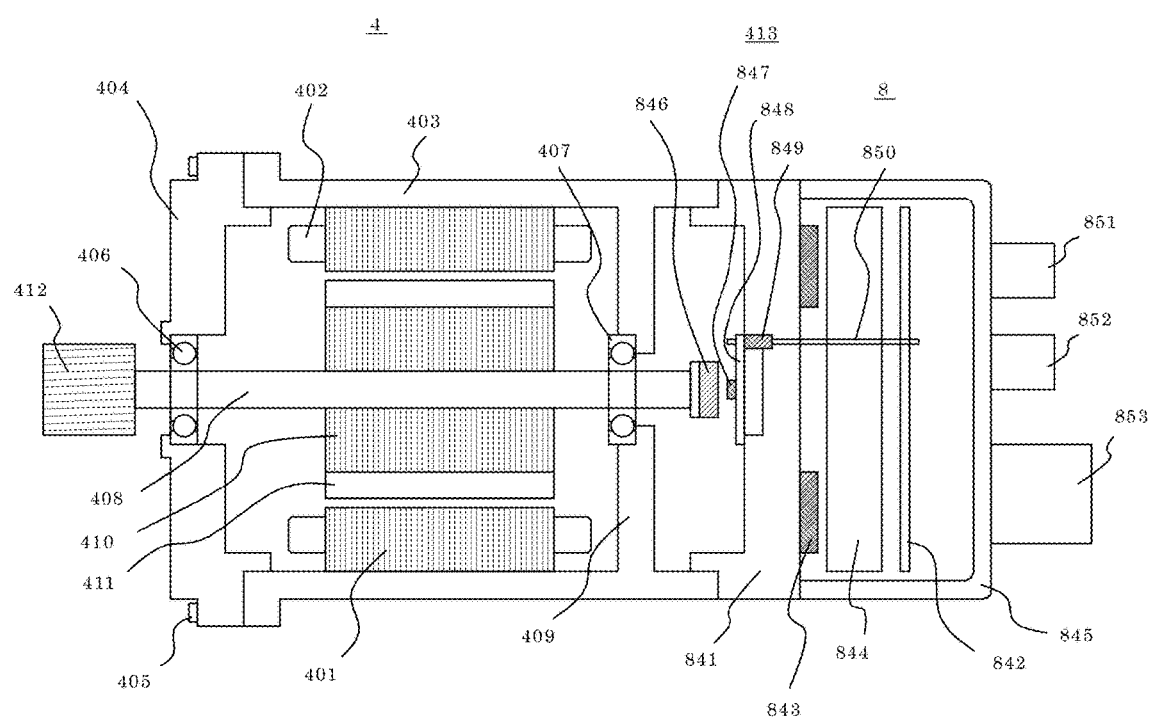
FIG. 4 Regarding to the first embodiment of the present invention.

FIG. 4 is a diagram in longitudinal view showing an example of an electric driving unit, as an illustration in FIG. 4, in the present invention, the electric drive unit is illustrated together with the multiple polyphase AC motor and the electronic control unit (ECU) as example.

Figure 5:
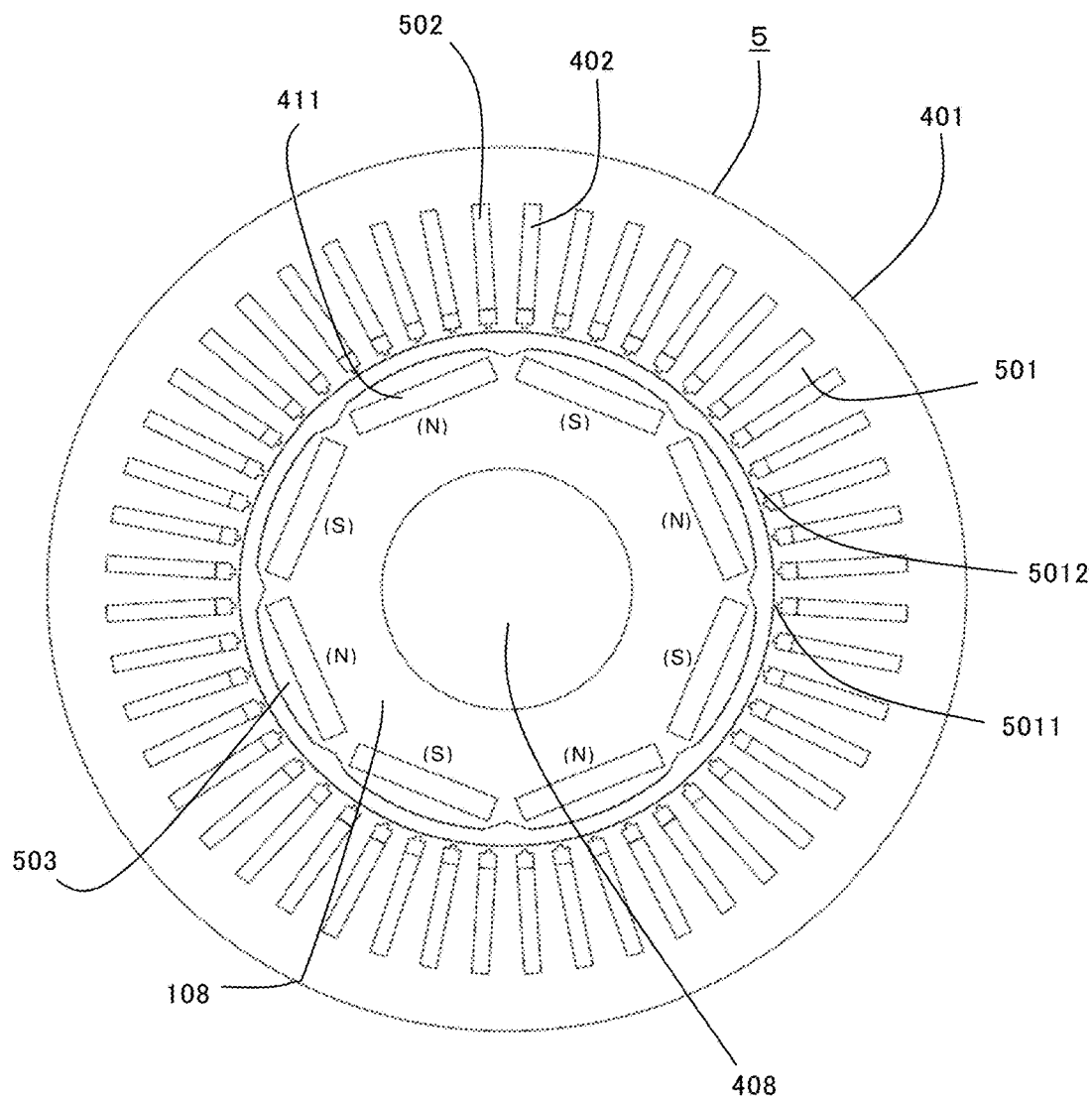
FIG. 5 Regarding to the first embodiment of the present invention.

FIG. 5, regarding the first of embodiment of the present invention, is a diagram showing a cross section of the extending direction of the rotation axis that composes the multiple polyphase AC motor.

First, the multiple polyphase AC dynamo-electric motor 4 will be explain by the vertical side structure FIG. 4.

The multiple polyphase AC motor (dynamo-electric machine) 4 owns, the stator core 401 constructed by stacking the electromagnetic steel sheet, the armature winding 402 supplied by the stator core, and the frame 403 that fixes the stator core 401.

Furthermore, the frame 403 is fixed by the bolt 405 and the housing 404 provided on the front part of the motor.

On the housing 404 a bearing A (406) is provided, the bearing A (406) and the bearing B (407) supports together the freely rotation of the axis of revolution 408.

On the housing 404 a bearing A (406) is provided, the bearing A (406) and the bearing B (407) supports together the freely rotation of the axis of revolution 408.

The stator core 410 is press-fitted on the axis of revolution 408 and a permanent magnet 411 is fixed on the stator core 410.

Next, the multiple polyphase motor will be explain in FIG. 5 by the structure of the cross section as viewed in the extending direction of its axis of rotation.

The armature 5 owns the stator core 401 composed of the magnetic body made by the 48 teeth 501 where the equally spaced magnetic air gap space direction is projected, as well as the 48 slots 502 created by the teeth, the armature coil accommodated in the 48 slots 502 of the stator core 401, and the armature winding 402 connected by certain pattern on the outside of the armature coil.

Here, the teeth 501 of the stator core 401 provides the flange part 5012 created by the circumferential direction from the teeth to the front end part of the magnetic air gap space direction, also, a part of the radially inner circumference of the adjacent flange part 5012 is connected by the magnetic connection part 5011.

In this way, by using each teeth 501 adjoined to the flange part 5012 to form a structure connected by the connection part 5011 in a part of those radially inner circumference, the inner circumference of the connection strength of the rotor 503 of the stator core 401 rises and the vibrations of the motor are decreased, furthermore, the projections from the stator core 401 of the armature winding 402 are effectively prevented.

Also, when connecting the flange part in this way, since the aperture part of the rotor side of the aforesaid slot disappears, the harmonic component of slot permeance that causes the cogging torque and the torque pulsations can be decreased, the cogging torque and the torque pulsations are decreased.

Furthermore, by connecting the flange part as described above, the connection part becomes the path of the magnetic flux to increase the inductance Ld of the d-axis rotor, it is possible to strengthen the effect of the weakening control field, as the voltage saturation can be alleviate, it is possible to improve the high rotational torque of the motor.

Moreover, the rotor owns the iron core rotor made of magnetic body, and the permanent magnet that generates the 8 fields installed in the iron core rotor above-mentioned. Also, A rotating shaft if provided in the center of the iron core rotor.

Figure 6:
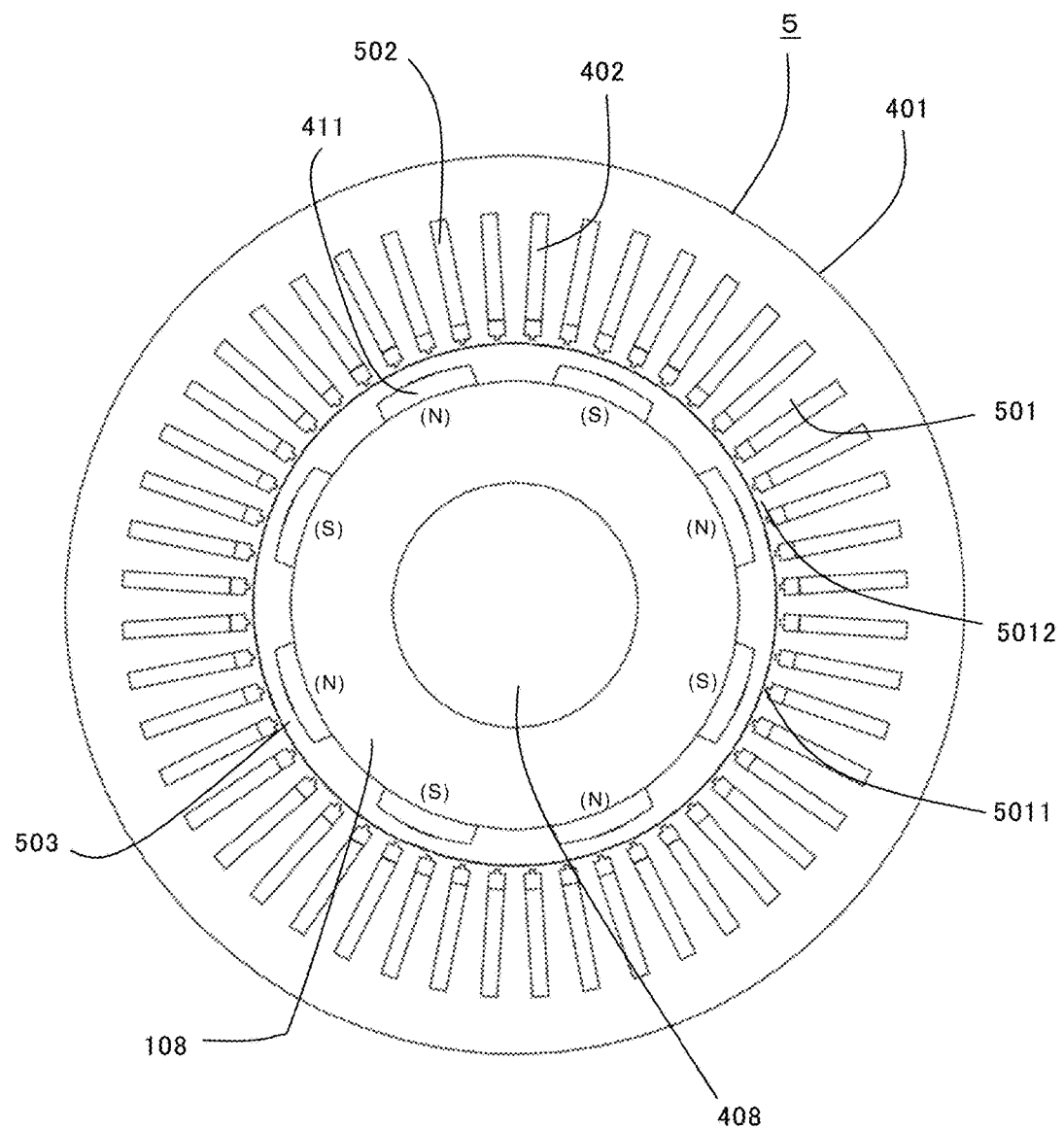
FIG. 6 Regarding to the first embodiment of the present invention.

Further, in FIG. 5, a permanent magnet is disposed in the interior of the iron core rotor, but it is also possible to dispose a permanent magnet on the surface of the iron core rotor as shown in FIG. 6.

Figure 7:
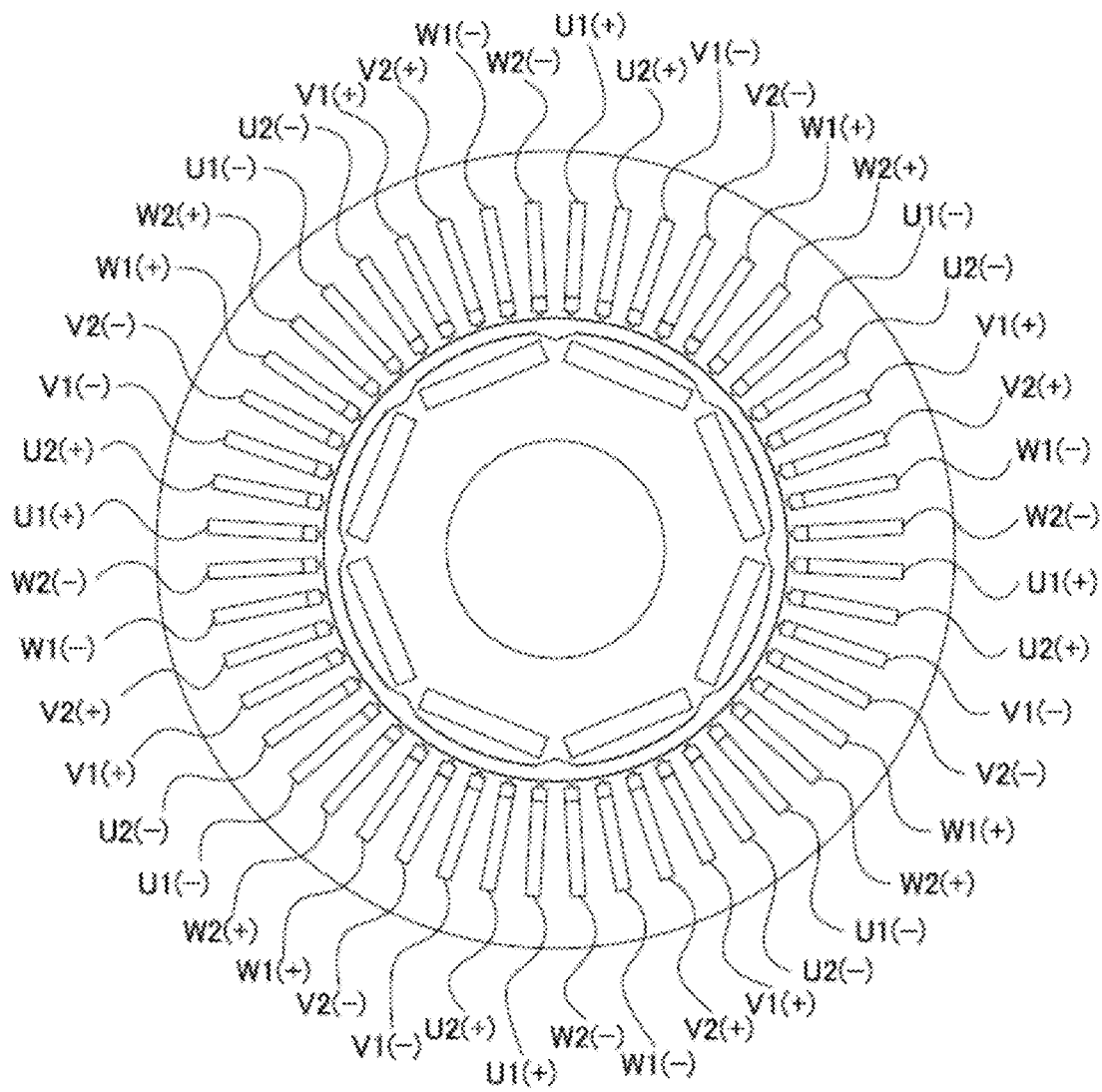
FIG. 7 Regarding to the first embodiment of the present invention.

Also, as shown in FIG. 6, in the armature winding 402, the 6 armature winding 402 (U1, V1, W1, U2, V2, W2) are split in the group 1 (U1, V1, W1) and the group 2 (U2, V2, W2) and extended over a multitude of teeth 501 in the 48 slots 502 created by the stator core 401, Here, FIG. 7 is a cross-section view showing a winding method of the multiple-polyphase AC motor in FIG. 5, the symbols [+] and [−] indicates that the winding polarity is reversed to each other.

Also, each winding is inserted by the same number of turns in the slot 502 to fix the armature winding 402.

Although the armature winding 402 in each group are connected to each other, the group one of the armature winding (first winding group) and the group two of the armature winding (second winding group) are separated electrically without being connected.

In this way, the method consisting of extending over multiple teeth across the armature winding is generally called distributed winding, in general, since the harmonic components of the magneto-motive force of the armature winding are reduced, the torque pulsation decreases.

Further, regarding the first winding group, when the second winding group rotate electrically to 360° the angle occupied in the circumferential direction of the pair of N and S poles of the rotor, the brushless motor on the present embodiment has an electrically phase difference of a 30° electric angle.

Further, when the angle occupied in the circumferential direction of the pair of N and S poles rotates electrically to 360°, the coil pitch of the winding is set to 180° to all the pitch winding.

Figure 1:
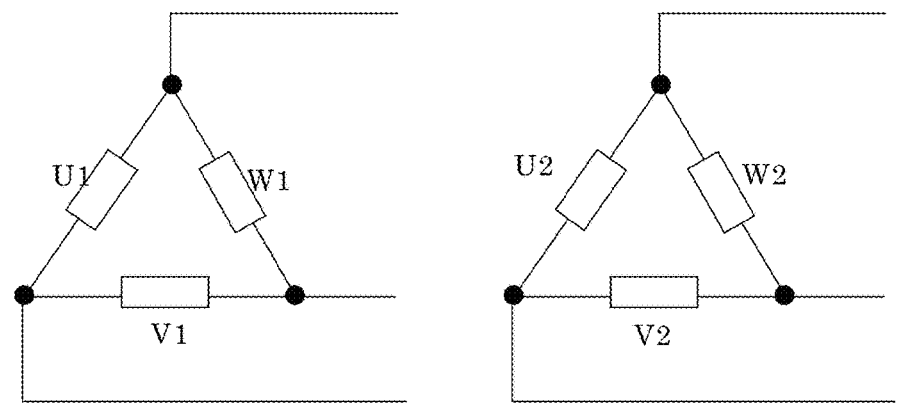
FIG. 1 Regarding to the first embodiment of the present invention.
Figure 1:
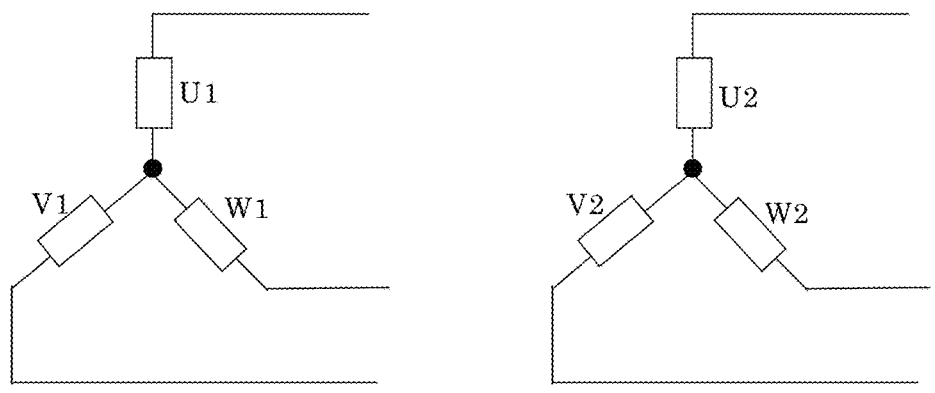

As shown in FIG. 1, these winding groups are connected respectively by Y or Δ connections, and are disposed to be duplicated in 2.

[Description of Double Inverter]

Figure 8:
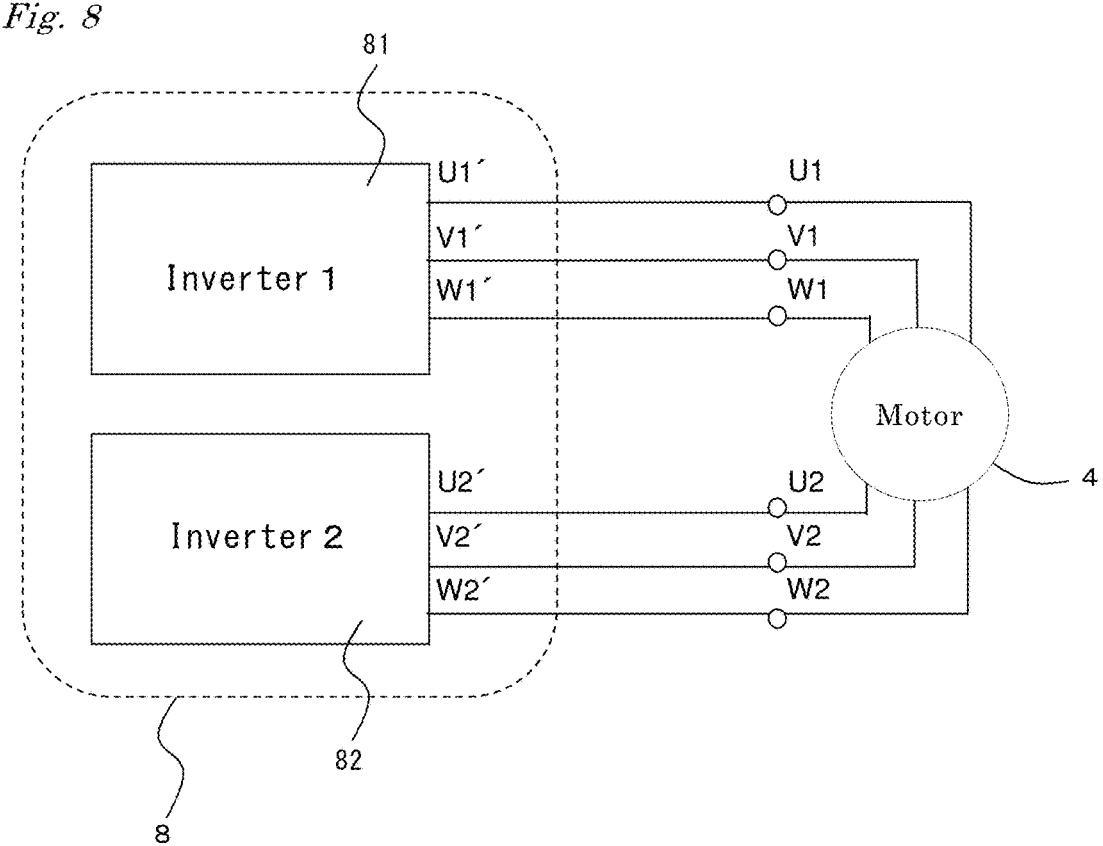
FIG. 8 Regarding to the first embodiment of the present invention.

Regarding to the first embodiment of the present invention, FIG. 8 is a circuit diagram showing a motor driving method and a motor driving device of the multiple-polyphase AC motor.

As shown in the same figure, the 6 armature windings (U1, V1, W1, U2, V2, W2) of the multiple polyphase AC motor are connected mutually to U1, U1 and U2, U2, V1 and V1, V2 and V2, W1 and w1, W2 and W2 to the three terminals (U1, V1, W1) of the first inverter (motor driving device) 1 (81), and to the three terminals (U2, V2, W2) of the second inverter (motor driving device) 2 (82).

The first inverter (motor driving device) 1 (81) and the second inverter (motor driving device) 2 (82) are disposed in the inner part on the ECU (Electronic Control Unit) 8.

ECU8 may also be a different shape configured to be integrated to the motor.

However, on the FIG. 8, if the ECU8 is configured to be integrated to the motor, it is necessary to provide six connection lines between the motor 4 and ECU8 if the motor 8 and the ECU8, moreover the size that became longer, the cost and the weight become a disadvantage, if the motor 4 and the ECU8 are assembled together as shown in FIG. 4, the six connection lines become shorter, the size, the cost and the weight become advantageous.

Furthermore, ECU8 as illustrated in FIG. 4 is assembled to the motor 4 through the heat sink 841, and is composed of the control circuit board 842 that have loaded the main function part of the ECU, the switching element 843 composed of the double inverter later mention, the middle component 844, the case 845 and such.

Further, the sensor part 412 composed of the magnetic sensor 847 that interacts with the sensor of the permanent magnet 846 mounted on the axis of revolution 408, the sensor circuit board 848 is loaded in the heat sink 841, the output of the sensor part 413 is sent to the main function part of the ECU of the control circuit board 842 through the connector component 850 supported by the support part 849.

[Description of Problems]

FIG. 1 is a diagram of the connection of the armature winding of the double three-phase winding motor. FIG. 1 (*a*) shows the connection Δ.

FIG. 1 (*b*) shows the connection Y. The present invention can be applied either to the connection Y and the connection Δ.

Figure 2:
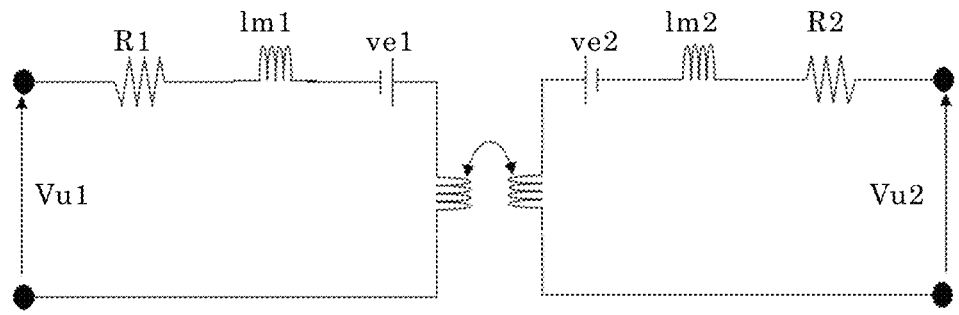
FIG. 2 Regarding to the first embodiment of the present invention.

The circuit equivalence of the U1 phase of the first group and the U2 phase of the second group may be represented as in the FIG. 2.

In FIG. 2 vu is each terminal voltage of the winding, iu is the electric current, R is the resistance, lm is the leakage inductance, M represents the mutual inductance, 1 or 2 of the subscripts indicates the primary or secondary side. Also, n is the turns ratio referred to the transformer. Among these values, especially lm and M are different from the value used in a normal motor control, the inductance between the multiple two phases are arranged in parallel.

In general, as in a multiple-polyphase AC motor the number of turns of the parallel windings are the same, n=1.

As the equivalence circuit V1 phase and V2 phase, W1 phase and W2 phase, U1 phase and V2 phase, U1 phase and W2 phase, V1 phase and U2 phase, V1 phase and W2 phase, W1 phase and U2 phase, W1 phase and V2 phase are the same as FIG. 2, in the case of a triphase equilibrium, even if the coordinate transformation is performed in the dq axis rotor from the UVW triphase, the equivalence circuit in the dq axis is the same as the one shown in FIG. 2.

Figure 3:
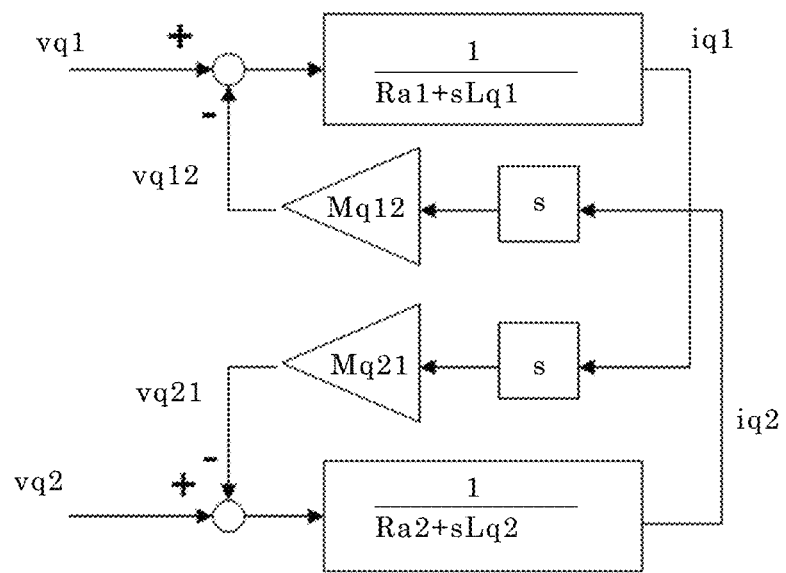
FIG. 3 Regarding to the first embodiment of the present invention.

Furthermore, the FIG. 3 is bloc diagram form showing the equivalence circuit of the q axis when there is a coordinate transformation in the two phase dq axis rotor.

In the Fig, vq1 and vq2 are the voltage of the q axis respectively to the group 1 and the group 2,
iq1 and iq1 are the electric current of the q axis respectively to the group 1 and the group 2, lq1 and lq2 are the q axis component of the self-inductance of the winding respectively to the group 1 and the group 2, Ra1 and Ra2 are the resistance component of the winding respectively to the group 1 and the group 2, Mq12 and Mq21 are the q axis component of the mutual inductance of the winding between the first group and the second group.
s represents the differential operator of the Laplace transform.
vq12 and vq21 are the noise voltage placed on the group 1 and the group 2, according to the mutual inductance between the group 1 and the group 2 respectively.

In addition, FIG. 3 illustrates an equivalent circuit of the q axis rotor, but the equivalent circuit of the d axis rotor have the same configuration.

Since the noise voltage is proportional to the differential value s that is the control response frequency of the electric current,
given that the electric current become larger in the motor control when control in high-speed, the motor control that cancels the torque pulsation on the high response frequency becomes difficult.

In particular in providing a magnetic material connection part in the stator core, since the magnetic permeability of the magnetic material is larger than the air, the magnetic resistance gap is reduced locally, the mutual inductance is also likely to increase.

[Description of the Noise Voltage]

Next, consider the effect of the noise voltage in the present embodiment.

Here, as shown in FIG. 3, in the multiple polyphase AC motor that owns the aforesaid multiplexing winding, the noise voltage acts on each other, for the electric current control system the noise value acts as iq1 and iq1.

[Number 1]

$$\text{Number 1 } i'_{q1} = -\frac{sM_{q12}i_{q2}}{R_{a1} + sL_{q1}} \quad \text{Equation (1)}$$

[Number 2]

$$\text{Number 2 } i'_{q2} = -\frac{sM_{q12}i_{q1}}{R_{a2} + sL_{q2}} \quad \text{Equation (2)}$$

Here, iq1 and iq2 are the winding q axis current of each of the respectively group 1 and group 2, Ra1 and Ra2 are the winding resistance of the each of the respectively group 1 and group 2, Lq1 and Lq2 are the q axis component of the self-inductance of the winding phase of each of the respectively group 1 and group 2, Mq12 is the q axis component of the mutual inductance that shows the interference of the winding group on the group 1 and group 2.

From above, if the frequency of the current control becomes higher, the differential operator s of Laplace transform becomes larger, also from the above equation, the it becomes obvious that the noise value almost depends on the magnetic coupling Mq12/Lq1 or the magnetic coupling Mq21/Lq2. If the same magnetic coupling is increased, the noise value becomes larger, by increasing the noise of the current control system, the control of motor is growing worse without being able to increase the response of the current control system.

In addition, as the winding group 1 and winding group 2 have a symmetric structure in the armature of the present invention, we may consider that Mq12/Lq1≈Mq21/Lq2.

Therefore, the subsequent magnetic coupling is mentioned as Mq12/Lq1.

Here, in the multiple polyphase AC motor of the present embodiment, by energizing the current I1 in the first winding group, a magnetic flux φM is generated in the chain path (hereinafter the path L) of the armature coil of the first winding group, a magnetic flux φM is generated in the chain path (hereinafter the path M) of the armature coil of the first winding group.

The self-inductance Lq1 is the ratio of the q axis component φL facing the q axis component rotor I1, the mutual inductance Mq12 is the ratio of the q axis component φM facing the q axis component rotor I1, the magnetism coupling Mq12/Lq1 has a strong correlation to φM/φL.

In the present embodiment, since the width b of the connection part 5011 is sufficiently smaller than the teeth 501 or the width cb of core back 91, according by the connection part, the magnetic flux flow is greatly inhibited by the path L and the path M.

So, when representing the inhibition amount of the flux as a magnetic resistance, the magnetic flux amount φL and φM of the paths L and M has a strong correlation to the magnetic resistance of the connection part.

Also, since the path L and the path M are different, the magnetic resistance that affects φM and φL is different.

As above, we can say that the magnetic coupling Mq12/Lq1 has a strong correlation in the magnetic resistance of each connection part in the path L and the path M.

Here, the magnetic resistance of the connection part changes from the non-linear particularity due to the magnetism saturation of the magnetic material, according by the magnetic flux amount of the unit cross-sectional area through the connection part.

Furthermore, as the amount of magnetic flux per unit cross-sectional area through the connection part vary by the variation of the magnetic flux generated from the rotor and the armature winding due to the rotation of the motor, the magnetic resistance is increased in the path L, if the magnetic resistance decrease in the path M, φM/φL is increased, the magnetic coupling Mq12/Lq1 increases.

However, if the amount of magnetic flux per unit area passing through the connection part is increased, we understand that the magnetic resistance of the connection part is fixed regardless of the magnetic flux amount passing through the connection part according by the magnetism saturation.

In the present embodiment, since one part of the adjoined flange part is connected, it is possible to compare and reduce the cross-sectional area when connecting all the flange parts to the cross-sectional area of the connection part.

Therefore, it is possible to increase the amount of magnetic flux per unit cross-sectional area of the connection part, and the connection part can have a fixed value of the magnetic saturation regardless of the amount of magnetic flux passing through the connection part.

Therefore, due to the rotation of the motor of the magnetic flux passing through the connection part, the magnetic resistance, φM, and φM don't vary greatly, and it becomes possible to decrease the magnetic coupling.

Moreover, in the present embodiment, as there is not great variations of φL and φM due to the rotation of the motor, it is possible to reduce the changes according by the self-inductance of the motor and the mutual inductance of the rotation of the motor.

Typically, if the self-inductance and the mutual inductance vary with the rotation of the motor, the control parameters of the motor vary and the control become difficult and a torque ripple is produced, but in the present embodiment, as it is possible to reduce the changes due to the aforesaid inductance of the motor rotation, the control of the motor rises, and the torque ripple is reduced.

[Description of the Basic Concept of the Invention]

Figure 9:
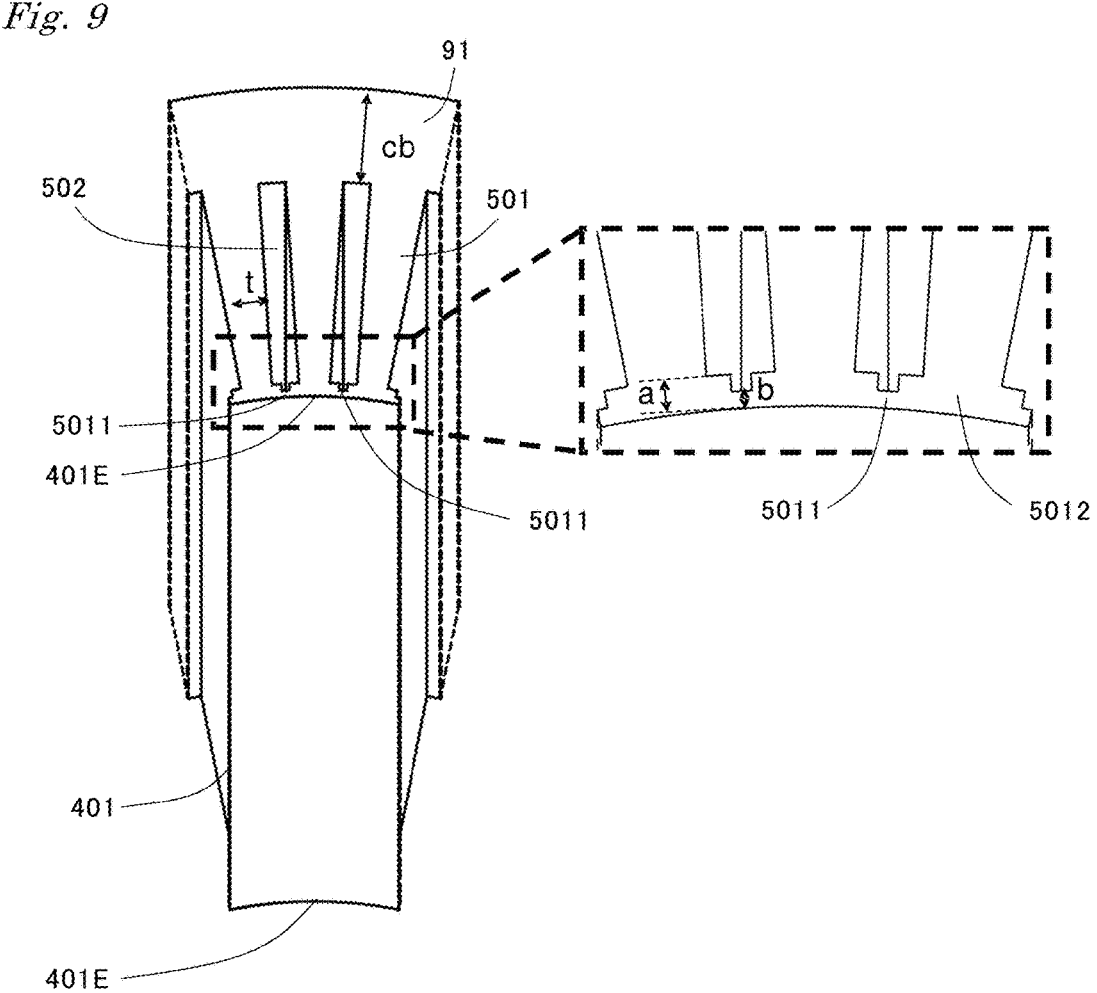
FIG. 9 Regarding to the first embodiment of the present invention.

FIG. 9 is an enlarging explanation view of one part (3 teeth) of the stator core 401 in the FIG. 5.

Here, one part of the radial direction between the adjoined flange part 512 is connected by the magnetic flux connection part 5011 as described above, when the radial direction of the flange part 5012 is the width a, the width b of the radial direction of the flange part 5011 is smaller than the width a of the radial direction of the flange part 5012.

Since the width b in the radial direction of the connection part 501 is smaller than the width b, the total area of the inner peripheral surface side of the connection part 5011 in the case of connecting all of the connection part 5011 is smaller than the total area of the inner peripheral surface of the flange part 5012 in the case of connecting all the flange part 5012. However, in FIG. 9, the space between the flange part 5012 is connected by the connection part 5011 on side of the rotor 503 of the stator core 401, but it is not limited to this position. The width b of the radial direction of the connection part 5011 is sufficiently smaller than the width cb of the radial direction of the core block 91 and the circumferential direction of the teeth 501 of the stator core. Also, each of the connection part 5011, 5011, . . . is equal to the number of slot 502, the magnetic resistance in the space of the both ends 401E, 401E of the axial direction (the extending direction of the axis of revolution 408) of the aforesaid axis of revolution 408 of the stator core 401 above-mentioned of each aforesaid connection part 5011, 5011, . . . are substantially the same, and the magnetic resistance 4 on the aforesaid both end 401E, 401E space on the flange part 5012 above-mentioned is bigger.

By such a configuration, as the magnetic flux density of the width b of the connection part 5011 becomes greater, a magnetic saturation occurs, and it is possible to increase the magnetic resistance of the connection part 5011.

As a result, since the leakage magnetic flux leaking through the connection part 5011 is reduced, it is possible to reduce the magnetic coupling between the winding group 1 and winding group 2, and the enhance of the controllability can be obtained.

Figure 22:
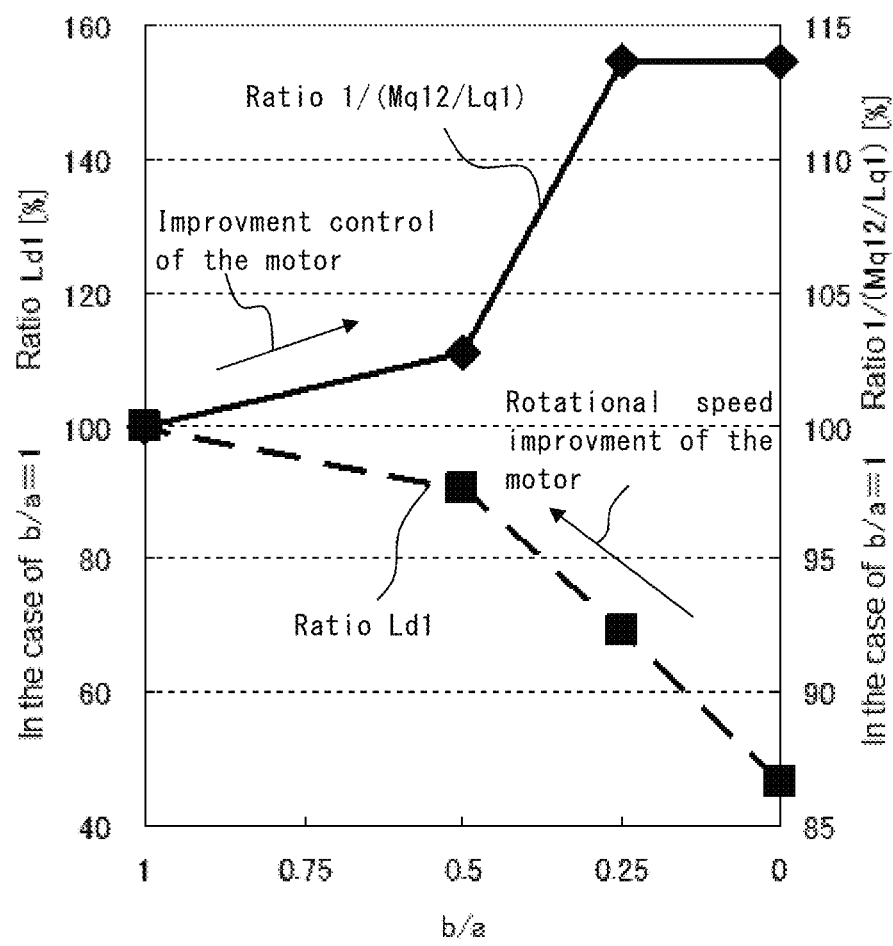
FIG. 22 is an explanation view showing the change of inductance and magnetic coupling.

FIG. 22 is a graph showing the 1/(Mq12/Lq1) of the group 1 when changing the width b of the flange part 5011 regarding the width a of the flange part 5012. However, in the same Fig, the self-inductance Ld1 component that affects the effects of the field weakening control described above is also mentioned.

Also, in the same Fig, it is different to the present embodiment, but when the width of the flange 5012 is the same as the width 5011, (b/a=1.0) and for comparison it is also mentioned when there is no connection part 5011 that (b/a=0.0), and shows the ratio regarding the case where Ld1 and 1/(Mq2/Lq1) when the connection part 5011 and the flange part 5012 have the same width (b/a=1.0).

From this result, as b/a decreases, 1/(Mq2/Lq1) increases, and Ld1 becomes smaller.

This means that on the other hand the control is improved, the flux control is no longer effective to weaken, and the decreased of the number of turns of the motor is shown.

From FIG. 22, about b/a=0 compared to b/a=1, 1/(Mq12/Lq1) is improved, but Ld1 is not so much decreased.

So, it can be seen that the control and the motor that collects the balance rotation can be obtained.

In addition, by connecting the adjacent flange part 5012, the connection strength of the stator core 401 is improved, the vibrations of the motor 4 are decreased, the protrude of the armature winding 402 from the stator core 401 is controlled, the cogging torque, torque ripple are reduced by reducing the harmonic components of the slot permeance, it becomes possible to improve the rotation torque of the motor by improving the inductance of the d axis rotor.

Furthermore, we can obtain the particularity that by connecting one part of the radial direction between the adjacent flange part 5012, the magnetic resistance of the connection part is adjusted, and that it becomes possible to decreased the magnetic coupling regarding the armature 5 shared by the field. Therefore, it is possible to increase the response of the current control system, and to improve the controllability of the motor.

Furthermore, it is possible to decrease the variations of the inductance when the rotor 503 rotates, and it is possible to decrease the torque ripple and to improve the control of the motor.

Also, since only the space on the radial flange part 5012 is connected, it is possible to reduce the leakage magnetic flux in the armature 5 which do not contribute to the torque, and it is possible to improve the torque.

[Description of the Magnetic Resistance of the Magnetic Pole 1 (Stair Shape)]

Figure 10:
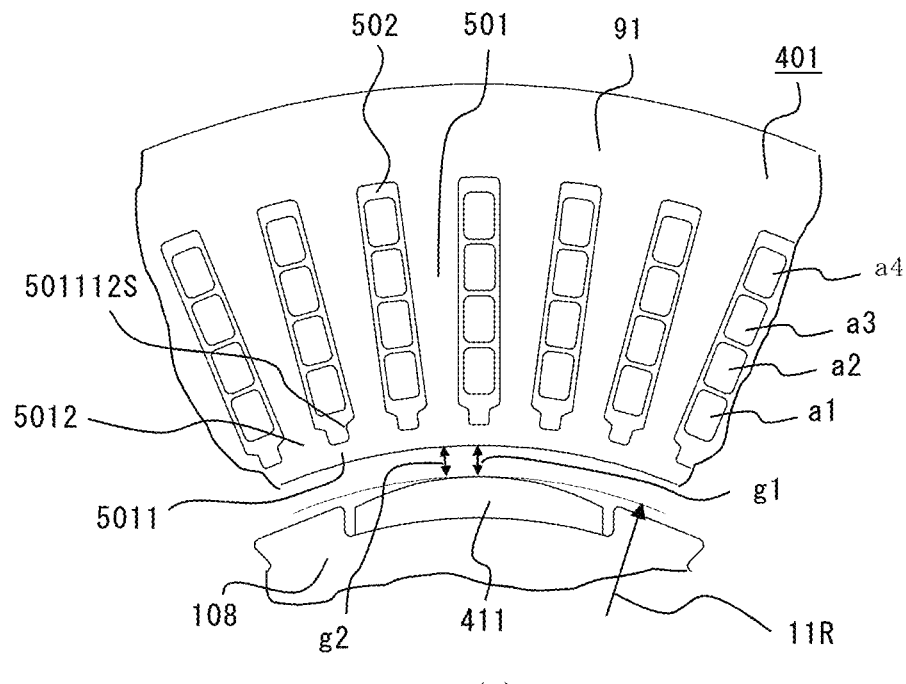
FIG. 10 Regarding to the first embodiment of the present invention.
Figure 10:
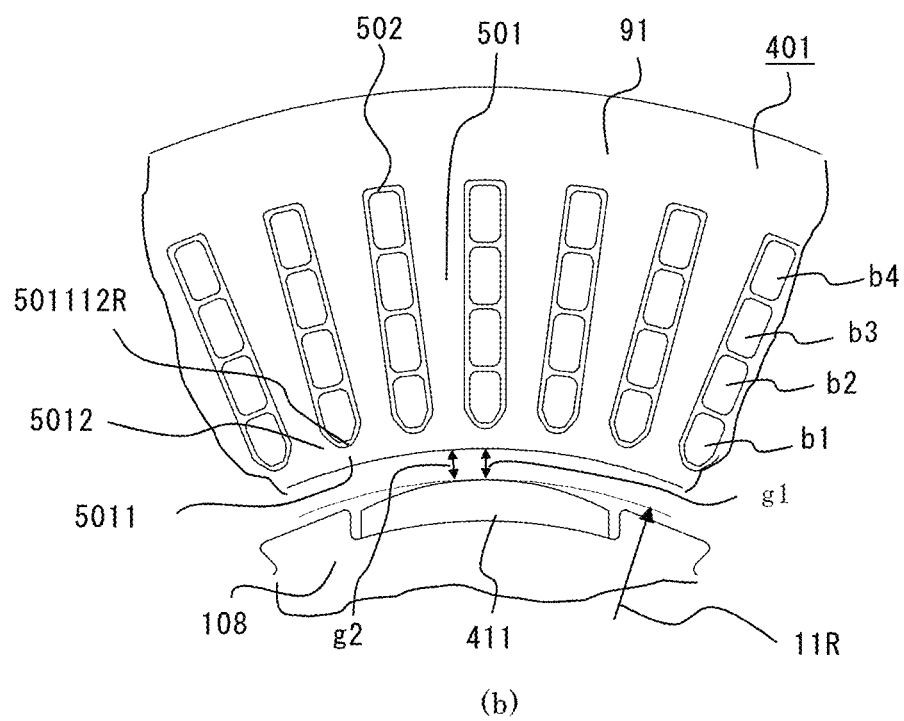

FIG. 10 (a) is an explanation diagram of the configuration in which the shape of the complex of the connection part 5011 and the flange part 5012 become step wised.

The Fig shows an enlarged part of one of the cross-sectional shape of the motor in order to facilitate comprehension.

The armature winding 402 is supplied by the slot 502 of the stator core which owns the core back 91, the teeth 501 and the slot 502.

In FIG. 10 (*a*), the 4 coils a1, a2, a3, a4 of the armature winding of the same phase is supplied by the slot 502.

A component is necessary to isolate the slot and the armature winding, but it is omitted in the drawing.

The flange part 5012 is provided by the NS magnetic pole part of the inner circumference of the teeth 501, further, the flange part 5012 is connected to the connection part 5011 to adjoin each other.

The connection part 5011 is composed of a magnetic material. For example, for the flange part 5012 to be integrated, a metal pattern electromagnetic steel sheet is created.

The rotor 503 is provided by the iron core rotor 108 and the permanent magnet 411.

The outer diameter 11R of the rotor 503 has a radius Rout. In the case where the permanent magnet 411 owns an anti-scattering metallic tube, the radius Rout is also defined by the tube.

When the permanent magnet 411 is buried by the iron core rotor 108, the radius Rout is defined by the most outer diameter of the stator core 108.

The outline of the complex of the connection part 5011 and the flange part 5012 has a stair shape 501112S.

Moreover, the gap length g1 of the rotor 503 in the connection part 5011 have the same structure as the gap length g2 of the rotor 503 in the connection part 5011. In this way, if the stair shape is 501112S, the distance between the flange part 5012 adjoined to the can be in equal parts.

Because of this, if the connection part 5011 have magnetism saturation, it is possible to reduce the leakage magnetic flux generated between the adjoined flange part 5012.

If the leakage flux is small the torque of the motor is not reduced, the motor can have a downsizing effect.

There is also the effect of reducing the amount of the permanent magnet 411.

Furthermore, according to the fact that the aforesaid gap length in the flange part 5012 is the same as the aforesaid gap length in the flange part 5011, the pulsation permeance are reduced, and the torque pulsation becomes smaller.

[Description of the Magnetic Resistance of the Magnetic Pole 2 (Curved Shape)]

FIG. 10 (*b*) is an explanation diagram of the configuration in which the complex shape of the connection part 5011 and the flange part 5012 become a curved shape 501112R.

Fig shows an enlarged part of the cross-sectional shape of the motor in order to facilitate comprehension.

The armature winding 402 is supplied by the slot 502 of the stator core 401 that owns the slot 502, the teeth 501 and the core back 91.

In FIG. 10 (*b*), the 4 coils b1, b2, b3 and b4 of the armature winding of the same phase are supplied by the slot 502.

A component is required for the isolation between the armature winding and the slot, but it is omitted in the Fig.

The flange part 5012 is created in the magnetic pole part of the inner circumference side of the teeth 501, furthermore, the adjoined flange part 5012 is connected by the connection part 5011.

The connection part 5011 is composed of magnetic material. For example, for the flange part 5011 to be integrated, a metal pattern electromagnetic steel sheet is created.

The rotor 503 is provided by the iron core rotor 108 and the permanent magnet 411.

The outer diameter of the rotor 503 has a radius Rout.

In the case where the permanent magnet owns an anti-scattering metallic tube, the radius Rout is also defined by the tube. When the permanent magnet is buried by the iron core rotor, the radius Rout is defined by the most outer diameter of the stator core.

The complex outline of the connector 5011 and the flange 5012 that became convex to the inner diameter side become the curve shaft 501112R.

As compared with the case where FIG. 10 (*a*) becomes a stair shape, in a large curved surface of the no-curvature corners, as it is possible to constitute the stator core 401, there is an effect to improve the life span of the metal pattern.

In addition, the armature winding b1 became convex to the inner diameter side become a cross-section shape similar to the curve 501112R.

In this way, the space factor of the slot 502 armature winding 402 can be enhanced, the resistance is lowered, the efficiency of the motor is improved and the output is improved.

In the FIG. 10 (*b*), The contour of the composite of the connection part 5011 and the flange part 5012, the convex inner diameter side became the curve shape 501112R, but the same effect can be obtain as a trapezoid shape where the inner diameter side is thinner.

In addition the configuration of the gap length g1 between the rotor 503 and the connection part 5011 in the flange part 5011 is the same as the gap length g2 between the rotor 503 and the flange part 5012 in the flange part 5012. From this, the pulsations of permeance can be reduced, and the torque pulsations are reduced.

[Supplementary Description]

Figure 11:
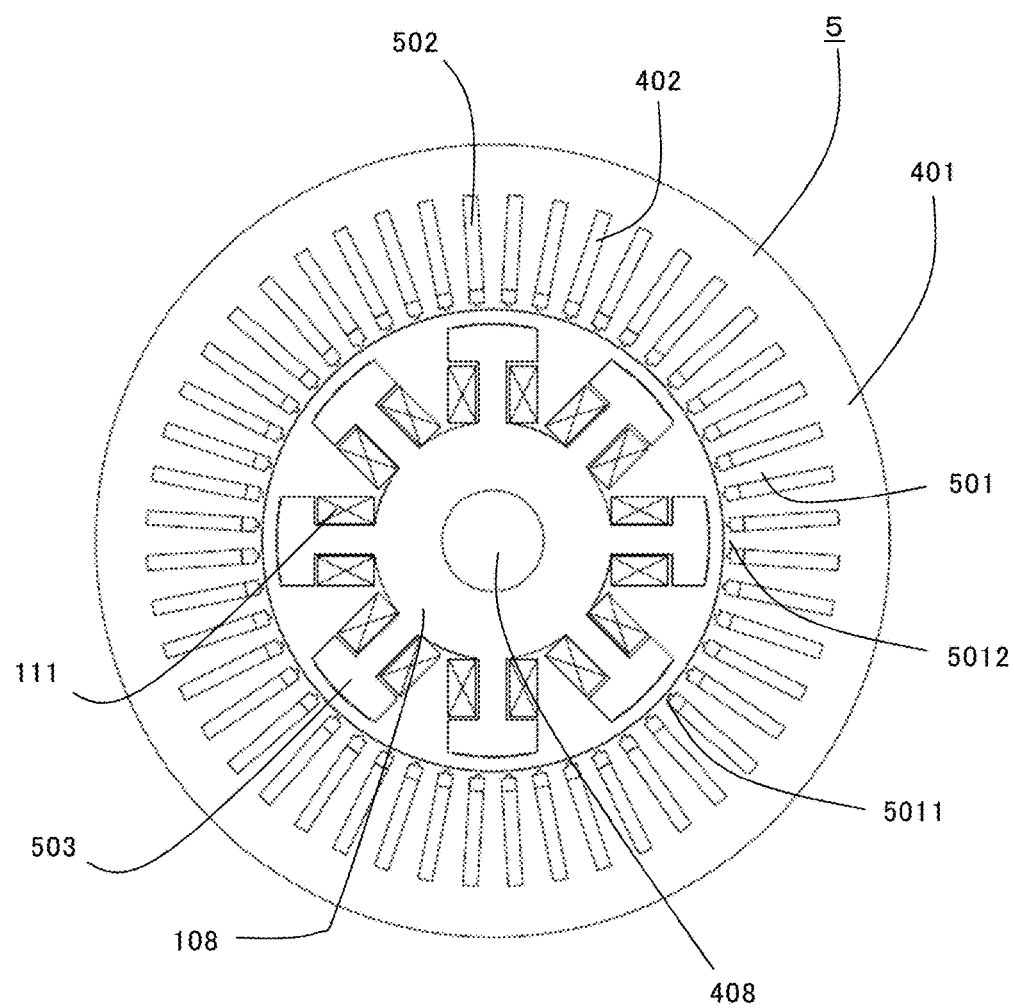
FIG. 11 Regarding to the first embodiment of the present invention.
Figure 12:
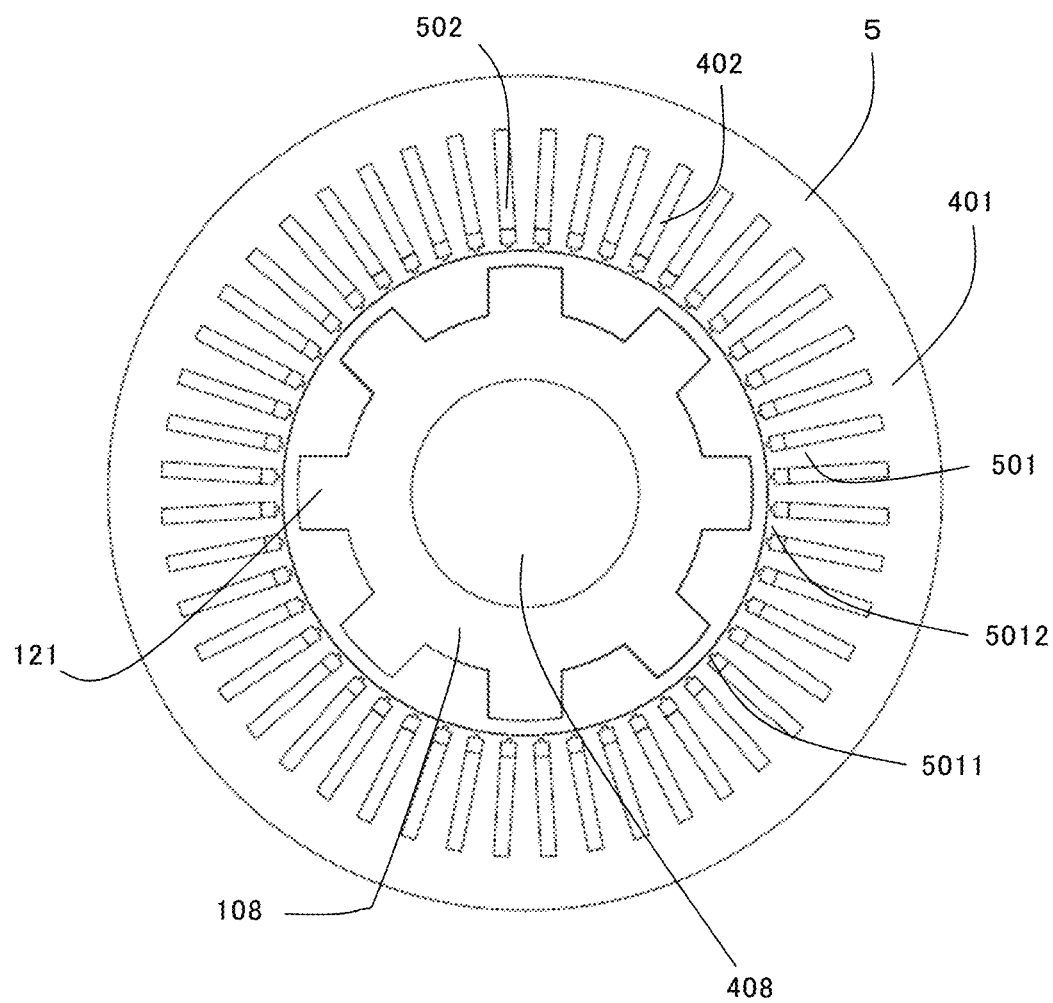
FIG. 12 Regarding to the first embodiment of the present invention.

Furthermore, in the description of the present embodiment, the rotor 503 owns the iron core rotor 108, the permanent magnet 411 generated by the field installed in the iron core rotor 108 above-mentioned, but it is not limited to this structure, for example as shown in FIG. 11 it owns the winding field pole 111 generated by the rotor 503, as shown in FIG. 12 there is a reluctance type rotor provided the protrusion part 121 by the iron core rotor 108, even if there is an induction machine, the similar argument as above-mentioned is completed.

Also, regarding the description above-mentioned, it is explain that the winding group have an electrically phase difference of 30°, the winding group 1 and winding group 2 are adjoined together in the 8 poles and 48 slots of the multiple polyphase AC motor, but the phase difference between the winding groups, located between the first and the second group, is not limited to the number of poles and the number of slots, the winding is electrically isolated in two parts, regarding the multiple polyphase AC motor driven by the each of the winding group in the different motor driving device, the same effects as above are obtained.

Also, as an integer of m superior at 1, the multiple polyphase AC motor where the number of poles is 2 m, and the number of slot is 12 m is provided by 2 motor driving device connected by separate two-three phase winding group above-mentioned, the winding group 1 and winding group 2 are disposed side by side, the winding pitch of the armature winding is at an electrical angle of 180° for the entire pitch.

the aforesaid 2 motors driving device 81 and 82, when the electric current or the voltage that have a phase contrast of 30° in the two polyphase group above-mentioned are supplied, it is possible to have a maximum of 1 to the distributed winding coefficient of the motor and the short pitch winding factor, and the torque of the multiple polyphase AC motor is improved.

Further, the description of the case where the armature winding 402 is wound across a plurality of teeth 501 has been given, but a similar argument as above can be satisfied in the case where it is intensively wound across one tooth 501. Also, according to the description above, the case where there is a full pitch winding of an electrical angle of 180° on the winding pith of the armature winding 402 has been explained, but the same effect can be obtained even if the electric angle is over 180°.

Also, the above description explain that the winding are electrically separated into two groups of winding, a multiple polyphase AC motor is driven by two different motor drive device 81 and 82, the same effect as described above can also be obtain when the number of the motor driving device 81 and 82 separated from the winding groups is increased. Also, in the flange part and the stator core of the present embodiment, even if the connection part of the adjoined flange part owns an stator core, teeth and other component, the same effect as described above can be obtained.

Second Embodiment

The second embodiment represents a multiple polyphase AC dynamo-electric motor that has the particularity to provide an stator core furnished by multiple magnetic teeth, an armature that owns the armature winding composed of the multiple polyphase winding supplied by the teeth of the slot wound around the teeth afore-mentioned, and a rotor that rotates in the axis of direction relatively disposed through a magnetic air gap, each of the plurality of teeth is provided with a flange part on the magnetic pole part of the rotor end part of the rotor side, the stator core has a magnetic connection part connected between the flange part above-mentioned adjoined to the NS magnetic pole of each of the plurality of teeth above-mentioned, the aforesaid connection part is provided on an inner peripheral side of the aforesaid slot which corresponds to each of the slots, provided on the inner peripheral side of the corresponding slot, the connection part is also disposed in the aforesaid slots supplied by the armature winding of each of the winding groups of the armature composed of the multiple polyphase winding group above-mentioned.

Hereinafter, a second embodiment of the present invention will be described below explaining the difference with the first embodiment, with reference to FIGS. 13 to 15.

Also, in the second embodiment, the other parts than those described below are the same as in the first embodiment.

Figure 13:
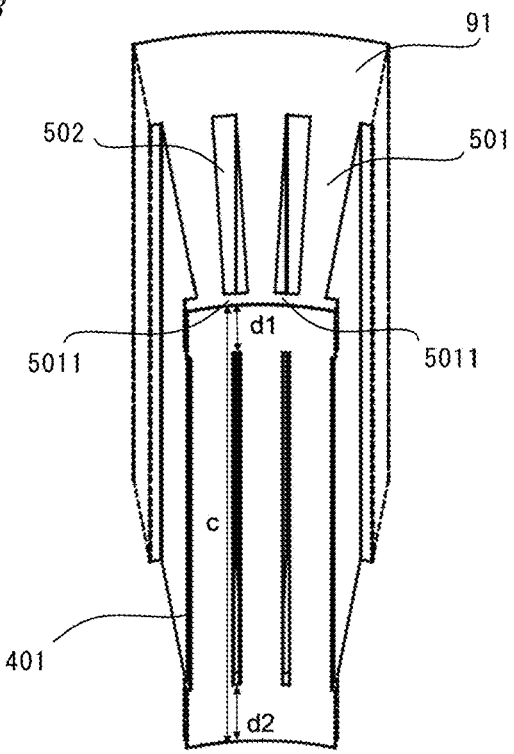
FIG. 13 is an enlarged sectional view of the iron stator core of the multiple polyphase AC motor.

According to the second embodiment of the present invention, FIG. 13 is an enlarged part of the explanatory view of the stator core of the multiple polyphase AC motor.

Here, when the axial thickness of the flange part 5012 is set to c, the total d of the axial thickness d1 and d2 of the connection part 5011 is smaller than the thickness c.

That is become d=d1+2. The connection part 5011 is finely divided (thickness d1, d2, d3, d4) in the axial direction as shown in FIG. 14, the radial direction of the connection width b is smaller than the width a of the flange part, as described in FIG. 15.

Figure 14:
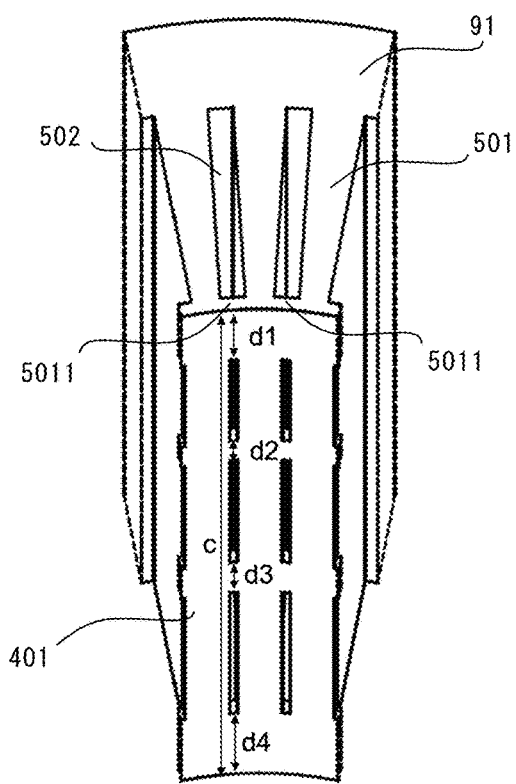
FIG. 14 Regarding to the second embodiment of the present invention.
Figure 15:
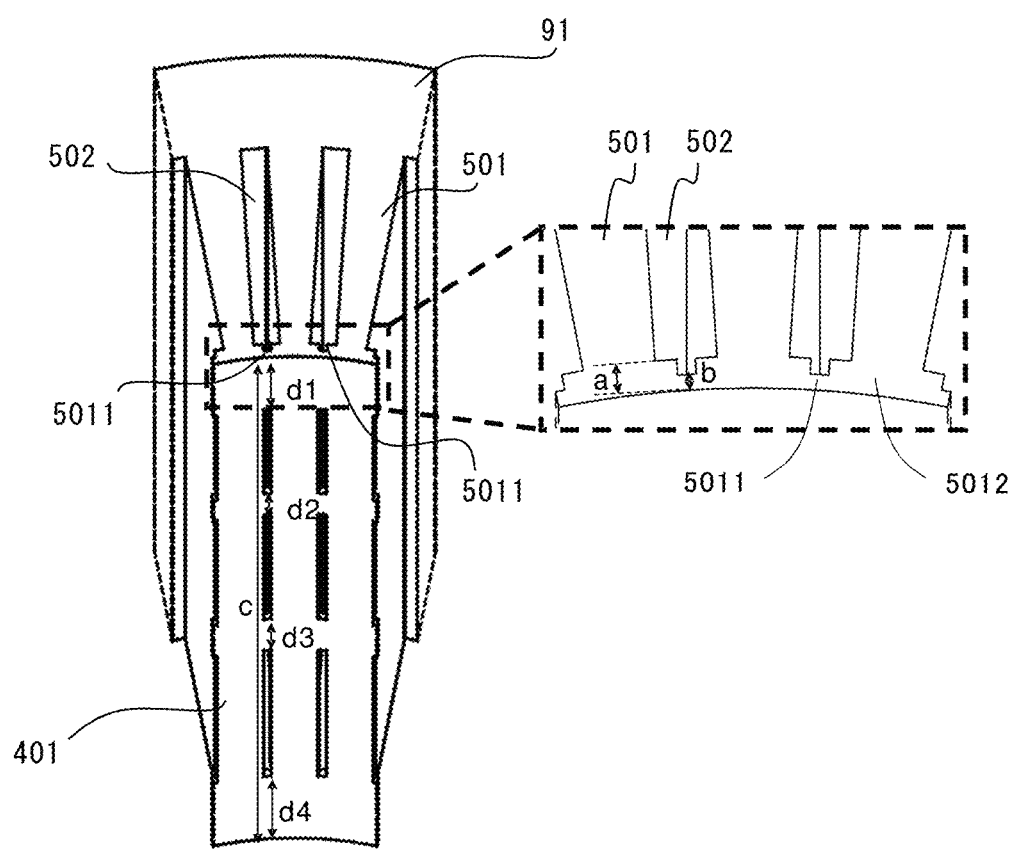
FIG. 15 Regarding to the second embodiment of the present invention.

Further, according to FIGS. 13 to 15, disposed in correspondence with each of the multiple slots, the magnetic resistance (the magnetic resistance of the total of d1 and d2 in FIG. 13, the magnetic resistance of the total of d1, d2, d3 and d4 in FIGS. 14 and 15) of the both ends 401E, 401E of the axial direction (the extending direction of the axis of revolution 408) of the stator core 401 above-mentioned of the connection parts 5011, 5011, . . . are substantially the same, and larger than the magnetic resistance of the both ends 401E, 401E of the aforesaid flange part 5012.

Thus, in the same manner as the first embodiment of the present invention, since one part of the axial direction of the adjoined flange part 5012 is connected by the magnetism of the connection part 5011, the vibration of the motor are reduced by improving the connection strength of the stator core 401, the jump out of the armature winding 402 of the stator core 401 are suppressed, the harmonic component of the of the slot permeance can be reduced, the cogging torque and the torque ripple are reduced, the high rotation torque of the motor is increased by improving the inductance of the rotor d axis.

Furthermore, as in the first embodiment, since it is possible to reduce the magnetic coupling, to increase the response of the current control system, and to improve the controllability of the motor.

Also, it is possible to reduce variations due to the rotation of the inductance of the motor and the self-inductance of the motor, to improve the controllability of the motor, and to reduce the torque pulsation.

Moreover, since only one part of the axial direction between the flange part 5012 is connected to the connection part 5011, it is possible to reduce the leakage flux in the armature that do not contribute to the torque, and it is possible to improve the torque.

In FIG. 15 the complex outline of the connection part 5011 and the flange part 5012 is shown as a stair shape, but it is not limited to this.

It is also shown in the case of the inside diameter became curved or convex like in FIG. 10 (*b*). Even in this case, the same effect is described in the first embodiment.

Moreover, since the width of the radial direction of the connection part 5011 above-mentioned is set to the half of the radial width of the flange part 5012, as the inductance is not so much reduced together with the improvement of the control, the weak magnetic flux control shows effects, and the number of revolutions of the motor (dynamo-electric machine) are maintained.

Further, from the arrangement of the armature winding shown in FIG. 7, we understand that the adjacent slot is dedicated respectively to the first and the second armature winding group. We understand that from the organization of the connection part of the FIGS. 5, 6, 9 and 10, the connection part is established by the inner radial direction of the adjacent slot. It is shown that the connection part is arranged according by the slot dedicated to the first and second armature winding group. From the FIGS. 13 and 14, the connection part is arranged through one part of the axial direction of the stator core.

In other words, the multiple polyphase AC dynamo-electric machine of the present embodiment is configured that the aforesaid connection part is arranged through one part of the axial direction of the stator core, inside the armature winding composed of multiple winding groups, the connection part is arranged according by the slot dedicated to the first and second armature winding group.

By such a configuration, due to the rotation of the inductance of the motor, not only the fluctuation can be reduce, as the balance of the inductance and the balance of the magnetic circuit of all the winding group is improved, it is possible to reduce the imbalance of the current between the winding groups, the torque ripple is also reduced.

As a result, a reduction of the noise vibration is obtained as special effect.

Third Embodiment

Figure 16:
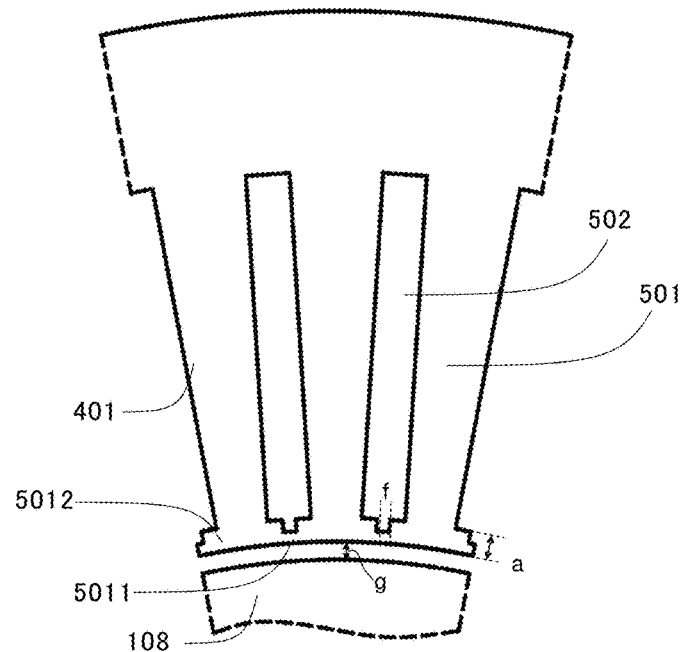
FIG. 16 Regarding to the third embodiment of the present invention.

According to the third embodiment of the present invention, FIG. 16 is an explanatory view showing the relationship between the stator core 401 and the iron core rotor 108.

In the present embodiment, only the stator core 401 is different from the first embodiment.

In the same Fig, the width a of the flange part 5012 is larger than the gap width g of the gap between the stator core 108 and the iron core rotor 108, and the interval f between the flange part 5012 is smaller than the gap width g.

Here, the magnetic flux generated by the armature 5 is divided mainly with the rotor 503 and the connection part 5011 above-mentioned, but there is a strong correlation between the magnetic resistance of the connection part 5011 and the magnetic resistance of the magnetic air gap between the iron core rotor 108 and the stator core 401.

However, the magnetic resistance of the magnetic air gap between the stator core 401 and the iron core rotor 108 has the characteristic to be proportional to the gap width g.

Here, the magnetic resistance in the case where the connection part 5011 is saturated, there is dependence on the interval f between the space in the flange part 5012 and the width a of the flange part 5012, the width a of the flange part 5012 is larger, and the interval f of the flange part 5012 become smaller.

In other words, the width a of the flange part 5012 is larger, if the interval f of the flange part 5012 become smaller, the magnetic resistance of the flange part 5011 become smaller than the magnetic resistance of the magnetic air gap between the iron core rotor 108 and the stator core 401, and it is possible to relatively enlarge the magnetic flux which flows in the side of the flange part 5012 adjoined from the flange part 5012 of the stator core 401. Therefore, in this embodiment the width a of the flange part 5012 is larger, since the interval f of the flange part 5012 is smaller than the gap width g, it is possible to increase the magnetic flux amount of the connection part 5011.

From the above, when the magnetic flux amount of the connection part 5011 is varied by the rotation of the motor, it is possible to fix the magnetic resistance of the connection part 5011 regardless of the magnetic flux amount, it is possible to reduce the variation caused by the inductance of the rotation of the motor and the magnetic coupling.

Incidentally, in the present embodiment, the width a of the flange 5012 is grater than the gap width g, the interval f between the flange part 5012 is made smaller than the gap width g, but maybe because the width a of the flange part 5012 is greater than the gap width g, the same effect as above can be obtain even if the interval f of the flange part 5012 is smaller than the gap width g.

Fourth Embodiment

Figure 17:
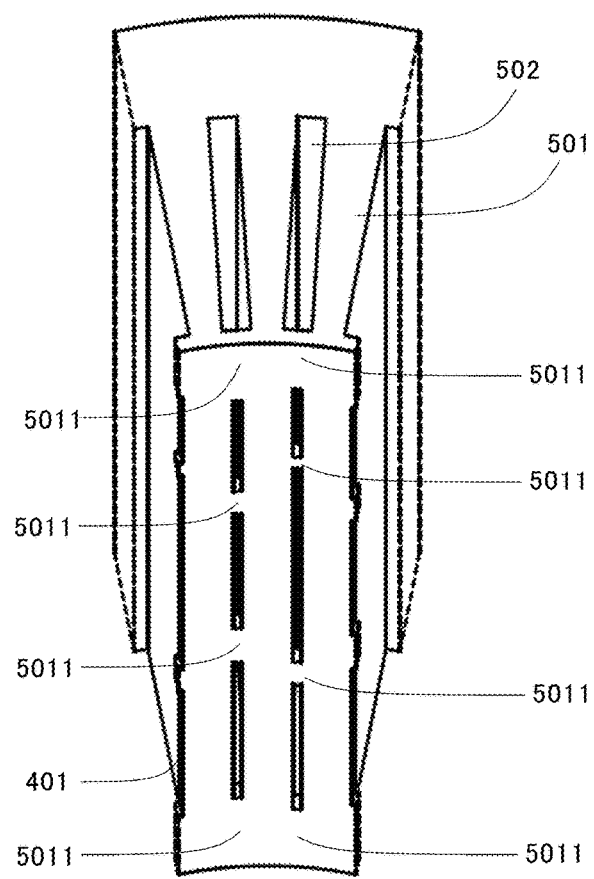
FIG. 17 Regarding to the fourth embodiment of the present invention.

According to the fourth embodiment of the present invention, FIG. 17 is an enlarged part explanatory view of one part of the stator core of the multiple polyphase AC motor.

In the present embodiment, according to the first embodiment, only the configuration of the stator core 401 is different, the connection position between the adjoined flange part 5012 is in the circumferential direction.

Also, according by the axial length of the stator core 401 configured by lamination of magnetic plates, the total axial thickness of the connection part 5011 is smaller than the total thickness of the axial direction of the flange part 5012.

Also, in the present embodiment, even if the connection position between the adjoined flange part 5012 is different in the circumferential direction, the magnetic resistance of the both ends 401E of the axial direction (extending direction of the rotation axis 408) of the axial direction 408 above-mentioned of the stator core 401 of each of the connection part 5011, 5011, . . . is substantially the same, and is larger than the magnetic resistance of the aforesaid both ends 401E of the flange part 5012 above-mentioned.

If the connection position between the adjoined flange part 5012 is different in the circumferential direction, the harmonic component of the slot permeance of the slot 502 is changed by the connection position.

It becomes possible to cancel an harmonic component of the slot permeance by combining the stator core in a different connection position, and it is possible to reduce the cogging torque and the torque pulsation.

Fifth Embodiment

Figure 18:
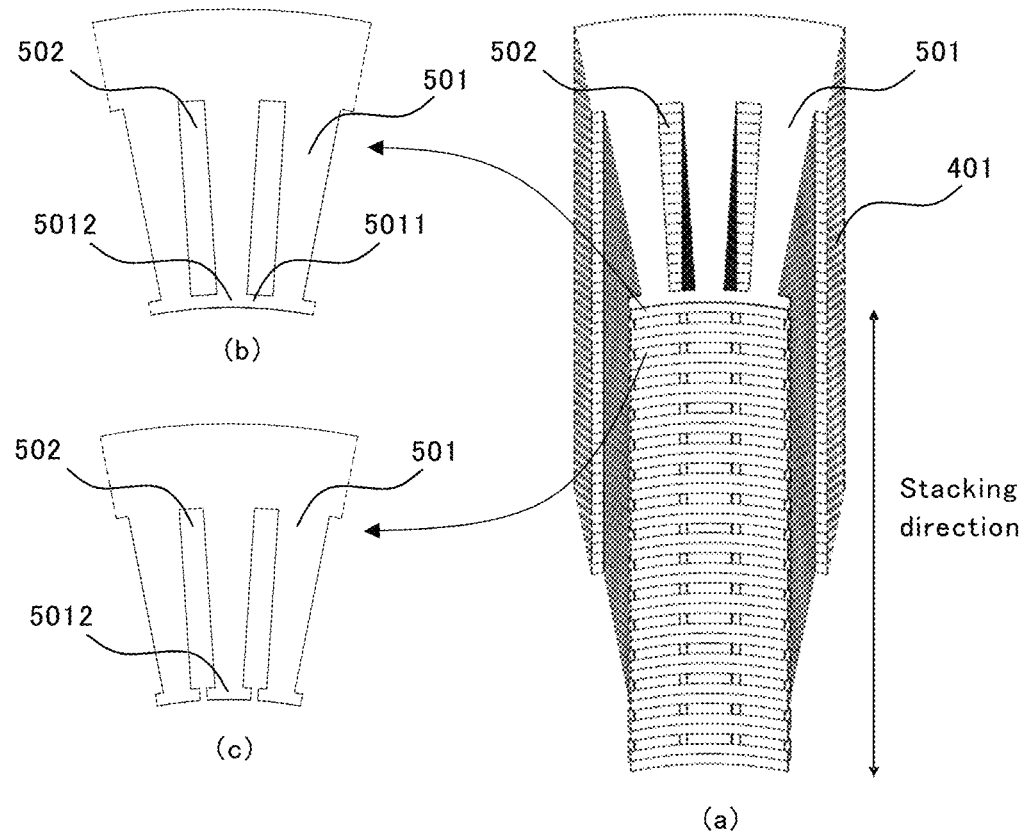
FIG. 18 Regarding to the fifth embodiment.

According to the fifth embodiment of the present invention, FIG. 18 is an enlarged part explanatory view of one part of the stator core of a multiple polyphase AC motor.

In the present embodiment, according to the first embodiment, only the stator core composition is different, the thin plate that owns the flange part 5011 connected to one part of the adjoined flange part 5011 by magnetic body, and the thin plate having no connection part are formed by stacking.

As described above, in the present embodiment, since one part of the flange part 5012 adjacent to the same manner as the first to fourth embodiment is connected by the magnetism of the connection part 5011, the vibration of the motor can be reduced by improving the connection strength of the stator core 401, the jump out of the armature winding 402 of the stator core 401 is suppressed, the cogging torque and the torque ripple can be reduced by reducing the harmonic component of the slot permeance, it is possible to increase the high rotational torque of the motor by improving the inductance of the rotor d axis.

Furthermore, similarly to the first to fourth embodiments, since it is possible to reduce the magnetic coupling, it becomes possible to increase the response of the current control system, and it is possible to improve the controllability of the motor. Also, the rotor can reduce the variation due to the inductance of the rotation of the motor when rotated, the controllability of the motor is improved, and it is possible to reduce the torque pulsation. Moreover, since only one part of the flange part is connector, it is possible to reduce the leakage flux in the armature that does not contribute to the torque, and it is possible to improve the torque.

Figure 19:
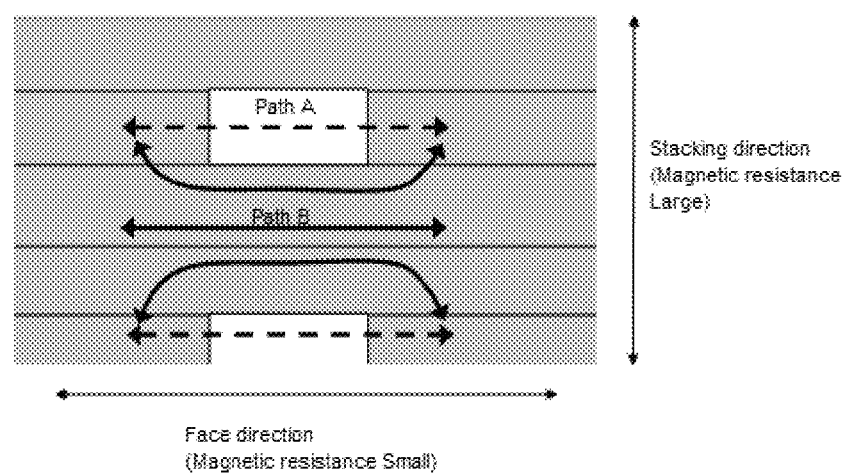
FIG. 19 Regarding to the fifth embodiment.

According to the present embodiment, FIG. 19 is an explanatory diagram showing the flow of the magnetic flux of the connection part 5011. According to the present embodiment, FIG. 19 is an explanatory diagram showing the flow of the magnetic flux of the connection part 5011. In the present embodiment, in relation to the magnetic flux regarding the path M and the path L when the first winding group has an electric current, the path A passing through the gap between the flange part 5012 and the path B passing through the gap between the flange part 5011 are divided in two.

For this reason, since the thin plate used for the armature of the present embodiment has a film on the surface, the magnetic resistance in the stacking direction of the thin plate is greater than the magnetic resistance in the plane direction.

Here, for the path B to pass through the magnetic connection part 5011 the magnetic resistance owns dependence regarding the magnetic flux, the magnetic resistance of the path A passing through the gap between the flange part 5012 is fixed through the gap regardless of the magnetic flux amount.

Thus, in this embodiment, because of the magnetic flux passing through the path A, the magnetic resistance passing through the path B is fixed regardless of the magnetic flux amount. Therefore, since it is possible to be closed to fix to a constant value the magnetic resistance that the rotation of the motor changed by the magnetic flux amount of the connection part 5011, it is possible to reduce variations due to the rotation of the magnetic coupling, the self-inductance motor and the mutual inductance motor.

Figure 20:
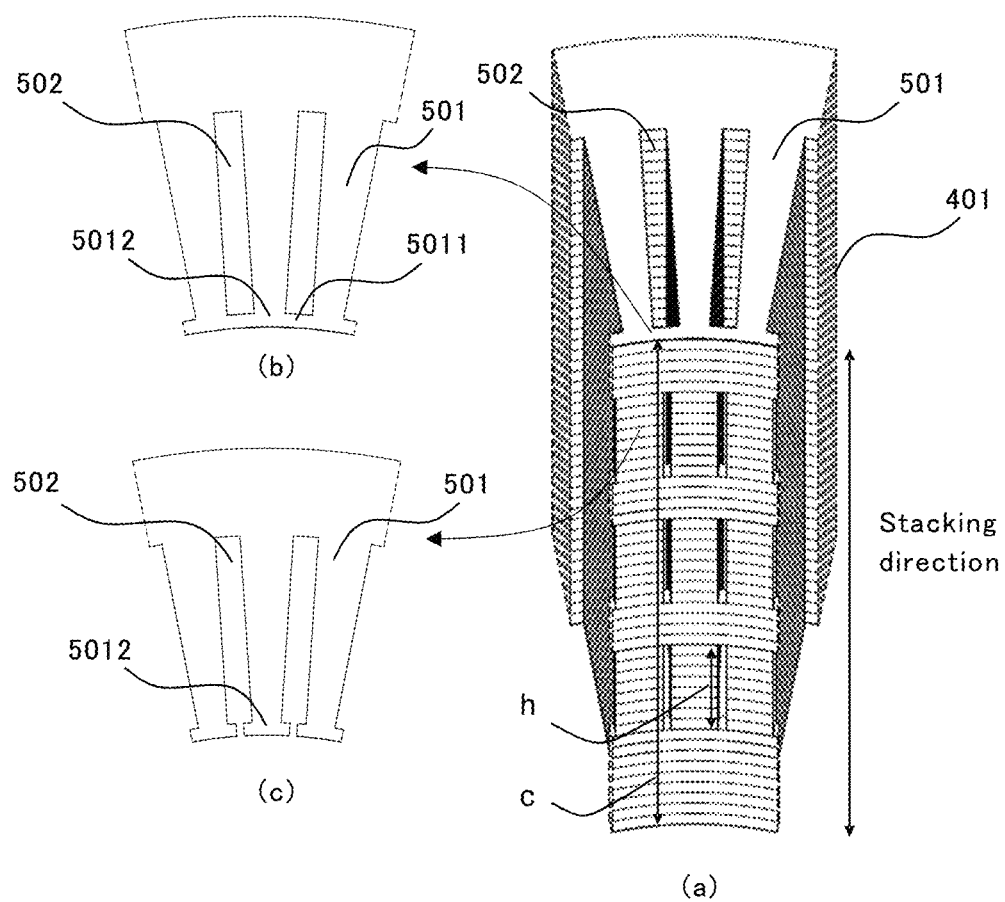
FIG. 20 Regarding to the fifth embodiment.

In FIG. 20, the axial thickness of the flange part c, the maximum value of the consecutive lamination thickness of the thin plate having no connection is set to h.

FIG. 20 is an explanatory diagram showing an example of the present embodiment.

On the same Fig (FIG. 20 (*c*)), the case when the thin plate that don't have connection part are consecutively stacked is described. As example of the present embodiment, the magnetic flux of the path a of FIG. 19, a thin plate having no connection part 5011 is increased relatively compared with the case of a not stacked thin plate as in FIG. 18, it is possible to be closed to fix to a constant value the magnetic resistance that the rotation of the motor changed by the magnetic flux amount of the connection part 5011, it is possible to reduce variations due to the rotation of the magnetic coupling, the self-inductance motor and the mutual inductance motor.

As described above, in the present embodiment, the thin plate (FIG. 20 (*b*)) which owns the connection part 5011 connected by a magnetic body to one part of the adjoined flange part 5012 and the thin plate (FIG. 20 (*c*)) that doesn't own the connection part 5011 are stacked, since the stacked position in the axial direction of the thin above-mentioned is regulated, it is possible to reduce magnetic coupling even while improving the high rotational torque of the motor.

Sixth Embodiment

Figure 21:
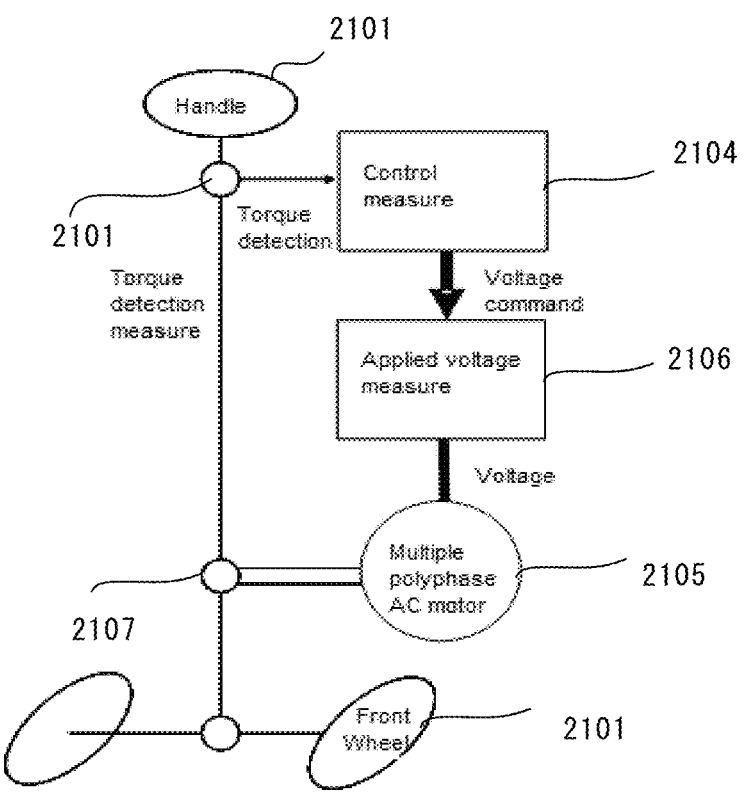
FIG. 21 Regarding to the sixth embodiment.

FIG. 21 is a diagram showing an electric power steering device that generates an assist torque by the multiple polyphase AC motor of the 1 to 5 embodiments.

The driver of the compartment rotates the steering wheel 2101 to the left and right and performs steering to the front wheel 2102. Torque detection way 2103 detects the steering torque of the steering system and output a detection torque to the control way 2104. For the multiple polyphase AC motor to generates the torque that assists the steering torque of the steering system, the control way 2104 operates voltage orders, and outputs it to the voltage application way 2106. The voltage application way 2106 applies voltage on the multiple polyphase AC motor 2105 based on the voltage orders, the multiple polyphase AC motor 2105 generates a torque assistance through the gear 2107.

In an electric power steering system equipped with a multiple polyphase AC motor 2105 as described in the present embodiment, since the torque pulsation and cogging torque of the multiple polyphase AC motor is reduced, it is possible to improve the steering feeling on the handle of the driver by reducing the pulsation, the sound of the steering can be reduced. Further, since the vibration of the motor 2105 is reduced, it is possible to reduce the sound transmitted to the compartment, and to improve the quietness of the vehicle.

Also, since the torque of the multiple polyphase AC motor is improved, the electric power steering device can be lighter, it is possible to improve the high rotation torque required such during emergency avoidance, or during torque rated value such as end contact steering time.

Also, as obvious from each of the descriptions and Figs above, the 1 to 6 embodiments have the following features.

Technical feature 1: A multiple polyphase AC rotating electric machine provides a rotor disposed relatively through a magnetic air gap, an armature that owns multiple winding groups wound around the teeth above-mentioned, an stator core provided by plurality of magnetic teeth, the aforesaid armature, each of the aforesaid plurality of teeth provides the magnetic part of the front end of the rotor side to the flange part, the stator core owns the magnetism of the connection part connected between the adjoined flange part regarding the magnetism part of each of the plurality of teeth, the magnetic resistance between the both ends of the axis direction of the aforesaid axial direction of the stator core of the connection part is substantially the same, and the magnetic resistance of the flange part is larger, and a multiple polyphase AC rotating electric machine have the following technical features.

[A] Since connector only on one part of the flange part, the connection part is saturated according to the magnetism generated by the rotor and the armature, the interference voltage due to the space in the winding group is reduced. Therefore, the torque pulsation due to the ripple component of the current to improve the response of the current control system is reduced.

[B] It is possible to improve the connection strength of the stator core, and to reduce the vibration of the motor.

[C] It is possible to reduce the cogging torque and the torque pulsation.

[D] Since only connected to only part of the space between the flange part, it is possible to reduce the leakage flux in the armature that do not contribute to the torque, and it is possible to improve the torque.

[E] It is possible to increase the inductance of the rotor d axis, to increase the field-weakening effect, to softening the voltage saturation, and to improve the high rational torque of the motor.

[F] Since connected to only one part of the space between the flange part, the connection part is saturated by the magnetic flux generated by the armature or the rotor, the variation due to the inductance rotation of the motor when rotated are reduced, the controllability of the motor is improved and it is possible to reduce the torque pulsation.

[G] It is possible to prevent the jumping coil of the stator core.

Technical feature 2: A multiple polyphase AC dynamo-electric machine that owns the technical feature 1 has the particularity to be equipped with the stator core has a slot that supplies the armature winding in each teeth, the aforesaid armature winding is composed of two groups, the first armature winding group is supplied with current for the first inverter, the second armature winding is supplied from with current from the second inverter, when the first armature winding has the phases U1, V1, W2, the second armature has the phases V2, W2, U1 and U2 are dedicated respectively in each other of the slots, V1 and V2 are dedicated respectively in each other of the slots W1 and W2 are dedicated respectively in each other of the slots, the electrical angle of the phases 2 and 3 are from 20° to 40°, it is possible to use the reluctance torque even if the control of the motor (dynamo-electric machine) is maintained, if a high output is possible to the motor (dynamo-electric machine), it is possible to reduce to six order torque ripple on same time.

Technical feature 3: In a multiple polyphase AC dynamo-electric machine that owns the technical features 1 or 2, a multiple polyphase AC dynamo-electric machine has the particularity that the radial width of the connection part is smaller than the width in the radial direction of the flange part, and the effect are reported to A, D and F.

[A] Since the connection area between the flange part is reduced, the connection part is saturated by the magnetic flux generated by the armature or the rotor, the interference voltage due to the space in the winding group is reduced.

Therefore the torque pulsation due to the ripple component of the current is reduced by improving the response of the current control system.

[D] Since the connection area between the flange part is reduced, it is possible to reduce the leakage flux in the armature that do not contribute to the torque, and to improve the torque.

[F] Since the connection area between the flange part is reduced, the connection part is saturated by the magnetic flux generated by the armature and the rotor, the variation caused by the rotation of the motor inductance when rotated is reduced, the controllability of the motor is improved, it is possible to reduce the torque pulsation.

Technical feature 4: In a multiple polyphase AC dynamo-electric machine that owns the technical feature 3, a multiple polyphase AC dynamo-electric machine has the particularity that the radial width of the connection part is half the radial width of the flange part, since the inductance is not so much reduced together with the improvement of the controllability, the weak magnetic flux control shows effect and the number of revolutions of the motor (dynamo-electric machine) are maintained.

Technical feature 5: In a multiple polyphase AC dynamo-electric machine that owns the technical features 1 to 4, a multiple polyphase AC dynamo-electric machine has the particularity that the shape of the flange part and the connection part created by the adjoined teeth become a stair shape, the gap length of the space of the connection part and the rotor regarding the connection part is the same as the gap length of the space between the flange part and the rotor regarding to flange part.

In addition to the effect to the technical feature 3, by becoming a stair shape, it is possible to have an equal distance of the parts in the space of the flange part.

Is the connection part is magnetically saturated, it is possible to reduce the leakage magnetic flux generated between the adjoined flange part.

Moreover, according to the gap length and the flange part of the connection part, it is possible to reduce the torque pulsation and the permeance pulsation.

Technical feature 6: In a multiple polyphase AC dynamo-electric machine that owns the technical features 1 to 4, a multiple polyphase AC dynamo-electric machine has the particularity that the shape of the flange part and the connection part created by the space between the teeth become a shape that owns the part constructed by a curved surface that becomes convex on the inner diameter side, the gap length between the rotor and the connection part in the connection part is the same as the gap length of the air gap between the rotor and the flange part of the flange part.

In addition to the effects of the technical feature 3, regarding the fact that the length gap of the flange part is the same as the length gap of the connection part, it is possible to reduce the torque pulsation and the permeance pulsation.

Also, in comparison when the flange part and the connection part when the shape is a stair shape, in a large curved surface of the curvature without angles, as the stator core is configured, the metal pattern life becomes longer. There is an effect that it is possible to increase the space factor in the slots of the armature winding.

Technical feature 7: In a multiple polyphase AC dynamo-electric machine that owns the technical features 1 to 6, a multiple polyphase AC dynamo-electric machine has the particularity that the stator core owns the connection part to a plurality of paths throughout all the length of the axial length, the total axial thickness of each of connection part of plurality of paths is less than the total of the axial thickness of the flange part, and the effect are reported to A, D and F.

[A] Since the connection area between the flange part is reduced, the connection part is saturated by the magnetic flux generated by the armature or the rotor, the interference voltage due to the winding group is reduced. Therefore, the torque pulsation due to the ripple component of the current is reduced by improving the response of the current control system.

[D] Since the connection area between the flange part is reduced, it is possible to reduce the leakage flux in the armature that do not contribute to the torque, and to improve the torque.

[F] Since the connection area between the flange part is reduced, the connection part is saturated by the magnetic flux generated by the armature and the rotor, the variation caused by the rotation of the motor inductance when rotated is reduced, the controllability of the motor is improved, it is possible to reduce the torque pulsation.

Technical feature 8: In a multiple polyphase AC dynamo-electric machine that owns the technical features 1 to 7, a multiple polyphase AC dynamo-electric machine has the particularity that the rotor is an iron core rotor, the radial width of the flange part is greater than the width of the opposing magnetic air gap of the rotor core and the stator core, and the effect are reported to A and F.

[A] Since the magnetic flux in the armature increases, the connection part is further saturated by the magnetic flux generated by the armature or the rotor, the interference voltage due to the winding group is further reduced. Thus the torque pulsation due to the ripple component of the current decreases by improving the response of the current control system.

[F] Since the magnetic flux in the armature increases, the connection part of the magnetic flux generated by the armature and the rotor is further saturated, the rotor further reduces the variation due to the rotation of the motor inductance, the rotation control of the motor is improved, it is possible to reduce the pulsation torque.

Technical feature 9: In a multiple polyphase AC dynamo-electric machine that owns the technical features 1 to 8, a multiple polyphase AC dynamo-electric machine has the particularity that the space between the adjoined flange part is smaller than the width of the opposing magnetic gap of the iron core rotor and the stator core, and the effect are reported to A and F.

[A] Since the magnetic flux in the armature increases, the connection part is further saturated by the magnetic flux generated by the armature or the rotor, the interference voltage due to the winding group is further reduced. Thus the torque pulsation due to the ripple component of the current decreases by improving the response of the current control system.

[F] Since the magnetic flux in the armature increases, the connection part of the magnetic flux generated by the armature and the rotor is further saturated, the rotor further reduces the variation due to the rotation of the motor inductance, the rotation control of the motor is improved, it is possible to reduce the pulsation torque.

Technical Feature 10:

In a multiple polyphase AC dynamo-electric machine that owns the technical features 1 to 9, a multiple polyphase AC dynamo-electric machine has the particularity that the connection part of the plurality of paths in the axial direction length of the stator core is composed of the connection part that has 2 or more different connecting position of the adjoined flange part. It is possible to cancel the harmonic component of the torque pulsation and the cogging torque.

Technical Feature 11:

In a multiple polyphase AC dynamo-electric machine that owns the technical features 1 to 10, a multiple polyphase AC dynamo-electric machine has the particularity that the armature is constituted by a stacking thin plate that has a connection part for connection the connection part between the adjoined flange part, and a thin plate that doesn't have a connection part, and the effect are reported to A and F.

[A] By the stacked structure, it is possible to reduce the magnetic flux in the axial direction, the connection part is saturated by the magnetic flux generated by the armature or the rotor, the interference voltage due to the winding group is further reduced. Thus, the torque pulstation due to the ripple component of the current is reduced by improving the response of the current control system.

[F] By the stacked structure, it is possible to reduce the magnetix flux in the axial direction, the connection part is saturated by the magnetic flux generated by the armature or the rotor, the variation of the rotor of the motor inductance when rotated is reduced, the torque pulsation is reduced by improving the controllability of the motor.

Technical Feature 12:

In a multiple polyphase AC dynamo-electric machine that owns the technical feature 11, a multiple polyphase AC dynamo-electric machine has the particularity that the thin plate that does not have connection part is not consecutively stacked, and the effect are reported to A and F.

[A] By a structure in which a thin plate having no connection part is stacked two or more times, it is possible to reduce the magnetic flux in the axial direction, since the amount of magnetic flux passing through the slot open (path A) is increased, interference voltage due to the winding group is reduced. Thus, the torque pulsation due to the ripple component of the current is reduced by improving the response of the current control system.

[F] By a structure in which a thin plate having no connection part is stacked two or more times, it is possible to reduce the magnetic flux in the axial direction, since the magnetic flux passing through the slot open (path A) is increased, the variation caused by the rotation of the motor (dynamo-electric machine) inductance when rotating is decreased, it is possible to reduce the torque pulsation.

Technical feature 13: In a multiple polyphase AC dynamo-electric machine that owns the technical feature 12, a multiple polyphase AC dynamo-electric machine has the particularity to owns a plurality of motor driving device connected by multiple polyphase winding groups, as the connection line that connects the inverter and the armature winding is short, the size, the cost and weight for become advantageous.

Technical Feature 14:

In a multiple polyphase AC dynamo-electric machine that owns the technical feature 13, an electric power steering device that generates an assist torque by the multiple polyphase AC motor, it is possible to improve the steering feeling of the driver by reducing the torque pulsation in the multiple polyphase AC motor, it is possible to improve the quietness of a vehicle equipped with an electric power steering.

Note that the present invention may be modified or omitted from each embodiment as appropriate within the scope of the invention.

Note that, in each drawing, the same symbols denote the same or equivalent portions.

REFERENCE SIGN LIST

501 Teeth,
401 Stator core,
401E Stator core both ends,
402 Armature winding,
5 Armature (Stator),
408 Axis of revolution, rotation shaft
5011 Connection part,
5012 Flange part,
503 Rotor,
81 Inverter 1 (Motor driving device),
82 Inverter 2 (Motor driving device),

The invention claimed is:

1. A multiple-polyphase AC dynamo-electric machine comprising:
  an armature having a stator core having a plurality of magnetic teeth,
  an armature winding containing the multiple polyphase winding group stored in slots between each of the teeth and winded around the teeth, and
  a rotor that is relatively positioned to the armature through the magnetic air gap and rotates around an axis of a rotation shaft, wherein
  each of the plurality of the teeth has a flange part extending circumferentially at a NS magnetic pole part of the rotor side end part, the stator core has a magnetic connection part which connects the flange parts of adjacent teeth to each other,
  the magnetic connection part is provided in each of the slots at an inner peripheral side of the corresponding slot,
  a radial width of each magnetic connection part is smaller than the circumferential width of each of the teeth and smaller than a radial width of the flange part,
  the armature is constituted by stacking a magnetic thin plate that has the magnetic connection part for connecting a part between the adjoined flange part by a magnetic substance, and a magnetic thin plate that does not have the connection part, and
  the magnetic resistance of the magnetic connection part in a space at both ends of the axial direction of the stator core is bigger than the magnetic resistance of the flange part in the space at the both ends of the axial direction of the stator.

2. The multiple polyphase AC dynamo-electric machine according to claim 1, wherein
  the stator core has a slot storing each winding of phases in each teeth,
  the armature winding is composed of two groups of three phase windings which configure the first armature winding group and the second armature winding group, the first armature winding group is supplied with current from the first inverter, the second armature winding is supplied with current from the second inverter, when the first armature winding group has the phases U1, V1, W1, the second armature winding group has the phases U2, V2, W2, each winding of phases U1 and U2 are stored respectively in the slots adjoined each other, each winding of phases V1 and V2 are stored respectively in the slots adjoined each other, each winding of phases W1 and W2 are stored respectively in the slots adjoined each other, relative electrical angle of current flowing the three phase winding of the two armature winding groups is from 20° to 40°.

3. The multiple polyphase AC dynamo-electric machine according to claim 1, wherein
radial width of the magnetic connection part is half of the radial width of the flange part.

4. The multiple polyphase AC dynamo-electric machine according to claim 1, wherein
shape of the flange part and the magnetic connection part both of which are disposed between the teeth adjoined each other are similar to a stair shape,
gap length of a gap between the rotor and the magnetic connection part is the same as the gap length between the flange part and the rotor.

5. The multiple polyphase AC dynamo-electric machine according to claim 1, wherein
each shape of the flange part and the magnetic connection part formed between the teeth adjoined each other is the shape having a part constructed by a curved surface that becomes convex on the inner diameter side,
gap length between the rotor and the magnetic connection part in the connection part is the same as the gap length of the air gap between the rotor and the flange part.

6. The multiple polyphase AC dynamo-electric machine according to claim 1, wherein
the rotor has a rotor core, the radial width of the flange part is greater than the width of the opposing magnetic air gap of the rotor core and the stator core.

7. The multiple polyphase AC dynamo-electric machine according to claim 1, wherein
a space between the adjoined flange part is smaller than the width of the opposing magnetic gap of the rotor core and the stator core.

8. The multiple polyphase AC dynamo-electric machine according to claim 1, wherein
a plurality of the thin plate each of which does not have the magnetic connection part is consecutively stacked.

9. The multiple polyphase AC dynamo-electric machine according to claim 1, wherein
a plurality of motor driving device individually connected to multiple polyphase winding groups are integrally mounted on the machine.

10. An electric power steering device comprising the multiple polyphase AC dynamo-electric machine as described in the claim 1, wherein
the multiple polyphase AC dynamo-electric machine is a multiple polyphase AC motor, and
an assist torque is generated by the multiple polyphase AC motor.

11. A multiple-polyphase AC dynamo-electric machine comprising:
an armature having a stator core having a plurality of magnetic teeth,
an armature winding containing the multiple polyphase winding group stored in slots between each of the teeth and winded around the teeth, and
a rotor that is relatively positioned to the armature through the magnetic air gap and rotates around an axis of a rotation shaft, wherein
each of the plurality of the teeth has a flange part extending circumferentially at a NS magnetic pole part of the rotor side end part, the stator core has a magnetic connection part which connects the flange parts of adjacent teeth to each other,
the magnetic connection part is provided in each of the slots to one part of several positions in the axial direction of the stator core and the corresponding inner peripheral side of the corresponding slot,
the magnetic connection part is also disposed in the slot supplied by any of the group of the armature winding composed of the multiple polyphase,
a radial width of each magnetic connection part is smaller than the circumferential width of each of the teeth and smaller than a radial width of the flange part,
the armature is constituted by stacking a magnetic thin plate that has the magnetic connection part for connecting a part between the adjoined flange part by a magnetic substance, and a magnetic thin plate that does not have the connection part, and
the magnetic resistance of the magnetic connection part in a space at both ends of the axial direction of the stator core is bigger than the magnetic resistance of the flange part in the space at the both ends of the axial direction of the stator.

12. The multiple polyphase AC dynamo-electric machine according to claim 11, wherein
total thickness in an axial direction of each of the magnetic connection part is smaller than the total of the thickness in an axial direction of the flange part.

13. The multiple polyphase AC dynamo-electric machine according to claim 11, wherein
the magnetic connection part of the plurality of portions is composed of the magnetic connection part of two or more different kinds by connecting position to the corresponding adjoined flange part.

14. The multiple polyphase AC dynamo-electric machine according to claim 11, wherein
the stator core has a slot storing each winding of phases in each teeth,
the armature winding is composed of two groups of three phase windings which configure the first armature winding group and the second armature winding group,
the first armature winding group is supplied with current from the first inverter,
the second armature winding is supplied with current from the second inverter,
when the first armature winding group has the phases U1, V1, W1, the second armature winding group has the phases U2, V2, W2, each winding of phases U1 and U2 are stored respectively in the slots adjoined each other, each winding of phases V1 and V2 are stored respectively in the slots adjoined each other, each winding of phases W1 and W2 are stored respectively in the slots adjoined each other,
relative electrical angle of current flowing the three phase winding of the two armature winding group is from 20° to 40°.

15. The multiple polyphase AC dynamo-electric machine according to claim 11, wherein shape of the flange part and the magnetic connection part both of which are disposed between the teeth adjoined each other are similar to a stair shape, gap length of a gap between the rotor and the magnetic connection part is the same as the gap length between the flange part and the rotor.

16. The multiple polyphase AC dynamo-electric machine according to claim 11, wherein each shape of the flange part and the magnetic connection part formed between the teeth adjoined each other is the shape having a part constructed by a curved surface that becomes convex on the inner diameter side, gap length between the rotor and the magnetic connection part in the connection part is the same as the gap length of the air gap between the rotor and the flange part.

17. The multiple polyphase AC dynamo-electric machine according to claim 11, wherein the rotor has a rotor core, the radial width of the flange part is greater than the width of the opposing magnetic air gap of the rotor core and the stator core.

18. The multiple polyphase AC dynamo-electric machine according to claim 11, wherein a space between the adjoined flange part is smaller than the width of the opposing magnetic gap of the rotor core and the stator core.

19. The multiple polyphase AC dynamo-electric machine according to claim 11, wherein a plurality of the thin plate each of which does not have the magnetic connection part is consecutively stacked.

20. The multiple polyphase AC dynamo-electric machine according to claim 11, wherein a plurality of motor driving device individually connected to multiple polyphase winding groups are integrally mounted on the machine.

21. An electric power steering device comprising the multiple polyphase AC dynamo-electric machine as described in the claim 11, wherein the multiple polyphase AC dynamo-electric machine is a multiple polyphase AC motor, and an assist torque is generated by the multiple polyphase AC motor.

* * * * *